US012109160B2

(12) United States Patent
Parikh et al.

(10) Patent No.: US 12,109,160 B2
(45) Date of Patent: Oct. 8, 2024

(54) APPARATUS FOR TURNING AND POSITIONING A PATIENT WITH SENSOR ELEMENTS AND METHODS OF USE THEREOF

(71) Applicant: Sage Products, LLC, Cary, IL (US)

(72) Inventors: Ritika Parikh, Canton, MI (US); Becker Ardahji, Middlebury, IN (US); Abhishek R. Patel, North Barrington, IL (US); Catherine S. Boulos, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 17/862,054

(22) Filed: Jul. 11, 2022

(65) Prior Publication Data

US 2023/0011458 A1 Jan. 12, 2023

Related U.S. Application Data

(60) Provisional application No. 63/220,847, filed on Jul. 12, 2021.

(51) Int. Cl.
*A61G 7/10* (2006.01)
*A61G 7/057* (2006.01)

(52) U.S. Cl.
CPC .......... *A61G 7/1026* (2013.01); *A61G 7/057* (2013.01); *A61G 2203/34* (2013.01)

(58) Field of Classification Search
None
See application file for complete search history.

(56) References Cited

U.S. PATENT DOCUMENTS 9,333,136 B2 * 5/2016 Gibson .................. A61G 7/057
2012/0186012 A1 7/2012 Ponsi et al.
2015/0143628 A1 5/2015 Fowler et al.
2017/0216117 A1 * 8/2017 Rigoni ............... A61G 7/05715
2022/0031196 A1 * 2/2022 Shinar .................. A61B 5/6891
2022/0233378 A1 * 7/2022 Mauser ................ A61G 7/0755

FOREIGN PATENT DOCUMENTS

CN 112716717 A * 4/2021 ............... A47G 9/10

* cited by examiner

*Primary Examiner* — Adam C Ortiz
(74) *Attorney, Agent, or Firm* — FOLEY & LARDNER LLP

(57) ABSTRACT

A patient positioning system comprising a wedge comprising a wedge body and a plurality of sensors coupled to the wedge body, wherein the wedge body is configured to deform in response to a pressure applied to the wedge body, the plurality of sensors coupled to the wedge body, wherein the plurality of sensors are configured to sense pressure applied to the wedge body.

20 Claims, 21 Drawing Sheets

200

200

APPARATUS FOR TURNING AND POSITIONING A PATIENT WITH SENSOR ELEMENTS AND METHODS OF USE THEREOF

CROSS-REFERENCE TO RELATED APPLICATIONS

This application claims the benefit of and priority to U.S. Provisional Patent Application No. 63/220,847, filed Jul. 12, 2021, which is hereby incorporated by reference herein in its entirety.

BACKGROUND

The present invention generally relates to an apparatus, system, and method for turning and positioning a person on a bed or the like, and, more particularly, to a sheet having a gripping surface, an absorbent pad, and/or a wedge for use in turning and positioning a person, utilizing selective glide assemblies to allow or resist movement of the components of the system in certain directions, as well as systems and methods including one or more of such apparatuses.

Nurses and other caregivers at hospitals, assisted living facilities, and other locations often care for bedridden patients that have limited or no mobility, many of whom are critically ill or injured. These immobile patients are at risk for forming pressure ulcers (bed sores). Pressure ulcers are typically formed by one or more of several factors. Pressure on a patient's skin, particularly for extended periods of time and in areas where bone or cartilage protrudes close to the surface of the skin, can cause pressure ulcers. Frictional forces and shearing forces from the patient's skin rubbing or pulling against a resting surface can also cause pressure ulcers. Excessive heat and moisture can cause the skin to be more fragile and increase the risk for pressure ulcers. One area in which pressure ulcers frequently form is on the sacrum, because a patient lying on his/her back puts constant pressure on the sacrum, and sliding of the patient in a bed can also cause friction and shearing at the sacrum. Additionally, some patients need to rest with their heads inclined for pulmonary reasons, which can cause patients to slip downward in the bed and cause further friction or shearing at the sacrum and other areas. Existing devices and methods often do not adequately protect against pressure ulcers in bedridden patients, particularly pressure ulcers in the sacral region.

One effective way to combat sacral pressure ulcers is frequent turning of the patient, so that the patient is resting on one side or the other, and pressure is taken off of the sacrum. Pillows that are stuffed partially under the patient are often use to support the patient's body in resting on his or her left or right side. A protocol is often used for scheduled turning of bedridden patients, and dictates that patients should be turned Q2, or every two hours, either from resting at a 30° angle on one side to a 30° angle on the other side, or from 30° on one side to 0°/supine (lying on his/her back) to 30° on the other side.

However, turning patients is difficult and time consuming, typically requiring two or more caregivers, and can result in injury to caregivers from pushing and pulling the patient's weight during such turning. Additionally, the pillows used in turning and supporting the patient are non-uniform and can pose difficulties in achieving consistent turning angles, as well as occasionally slipping out from underneath the patient. Further, patients who are positioned in an inclined position on the bed tend to slide downward toward the foot of the bed over time, which can cause them to slip off of any supporting structures that may be supporting them. And finally, caregivers are often responsible for multiple patients at one time and may lose track of the length of time a patient has been in a particular position, or may not be able to frequently check that the proper position of the patient is being maintained. As a result, ensuring compliance with turning protocols, Q2 or otherwise, is often difficult.

The present invention seeks to overcome certain of these limitations and other drawbacks of existing devices, systems, and methods, and to provide new features not heretofore available. The present invention seeks to overcome certain of these limitations and other drawbacks of existing devices, systems, and methods, and to provide new features not heretofore available.

SUMMARY

At least one aspect of the present disclosure relates to a patient positioning system. The patient positioning system includes a wedge having a wedge body, where the wedge body is configured to deform in response to a pressure applied to the wedge. The system further includes a plurality of sensors coupled to the wedge body, where the plurality of sensors are configured to sense pressure applied to the wedge.

Another aspect of the present disclosure relates to a patient positioning system. The system includes a sheet having a first slit and a second slit, where the sheet is configured to be positioned between a support surface and a patient. The system also includes a belt having a central pocket having a pad and a plurality of sensors, where the belt is configured to be selectively received by the first slit at a first end and by the second slit at a second end, and where the pad is configured to deform in response to a pressure applied to the central pocket and the plurality of sensors are configured to sense the pressure applied to the central pocket.

Yet another aspect of the present disclosure relate to a patient positioning system. The system includes a body having a first surface including a high-friction material, where the first surface is configured to adhere to a patient, and a second surface including a low-friction material. The system also includes a pad housed in the body, where the pad is configured to deform in response to a pressure applied to the body. The system further includes a plurality of sensors housed in the body, where the plurality of sensors are configured to sense the pressure applied to the body.

DETAILED DESCRIPTION

Figure 1:
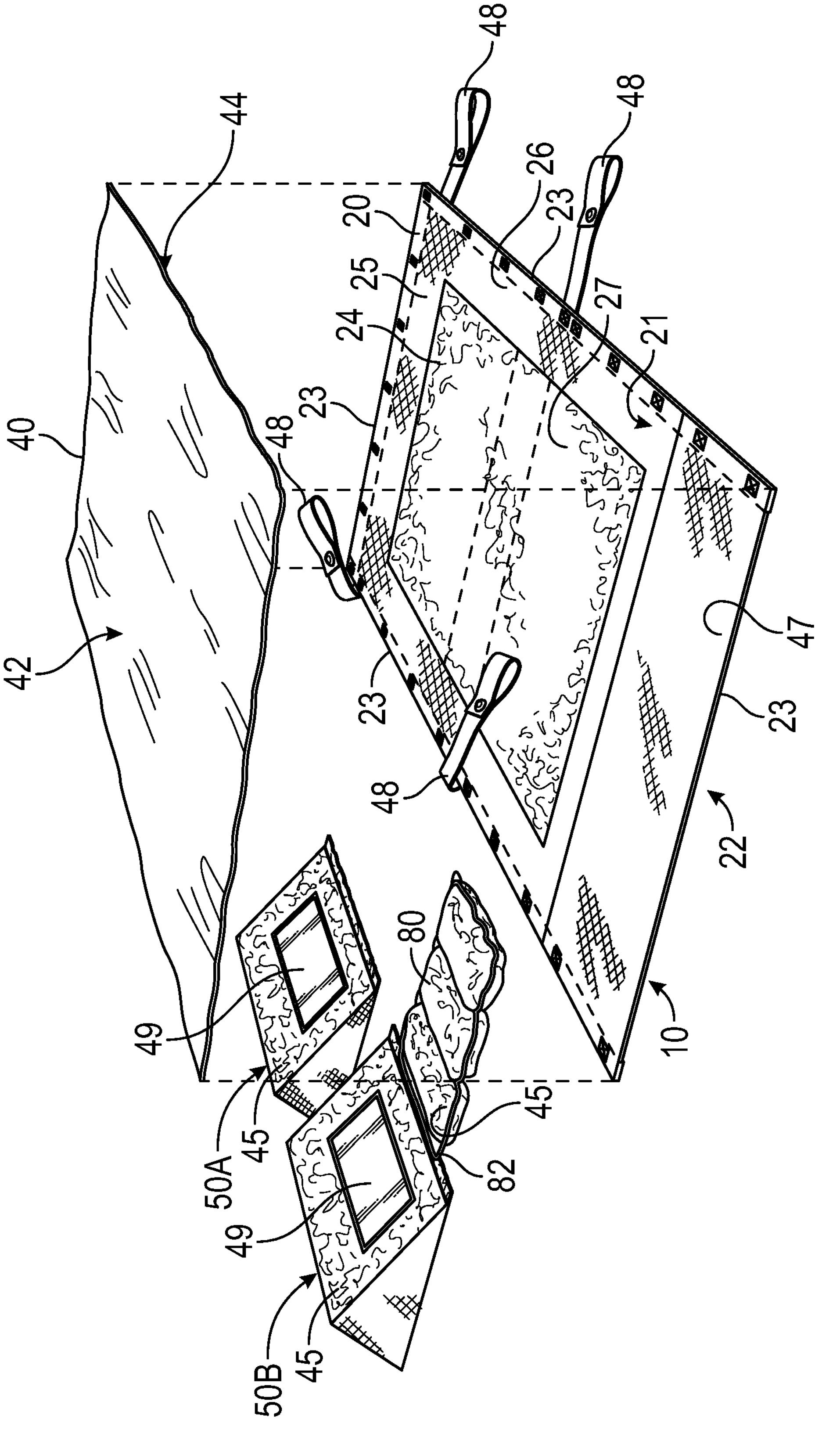
FIG. 1 is an exploded perspective view of one embodiment of a system for use in turning and positioning a patient, according to an exemplary embodiment.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the invention relates to one or more apparatuses or devices, including a sheet having a high friction or gripping surface, an absorbent body pad configured to be placed over the sheet, and one or more wedges and a support configured to be placed underneath the sheet to support the patient in various positions where the wedge and the sheet form one or more selective gliding assemblies, as well as systems including one or more of such devices and methods utilizing one or more of such systems and/or devices. Various embodiments of the invention are described below.

Referring now to the figures, and initially to FIGS. 1-8, there is shown an example embodiment of a system 10 for use in turning and positioning a person resting on a surface, such as a patient lying on a hospital bed. As shown in FIG. 1, the system 10 includes a sheet 20, an absorbent body pad 40 configured to be placed over the sheet 20, one or more wedges 50 configured to be placed under the sheet 20, and a support 80 configured to be placed under the sheet 20. The patient can be positioned on top of the body pad 40, with the body pad 40 lying on the sheet 20, and one or more wedges 50 and/or the support 80 optionally positioned underneath the sheet 20. The system 10 may be any system, including any features, in accordance with the embodiments described in U.S. Patent Publication No. 2015/0143628 entitled "Apparatus and System for Turning and Positioning a Patient," which is incorporated by reference herein in its entirety.

Figure 8:
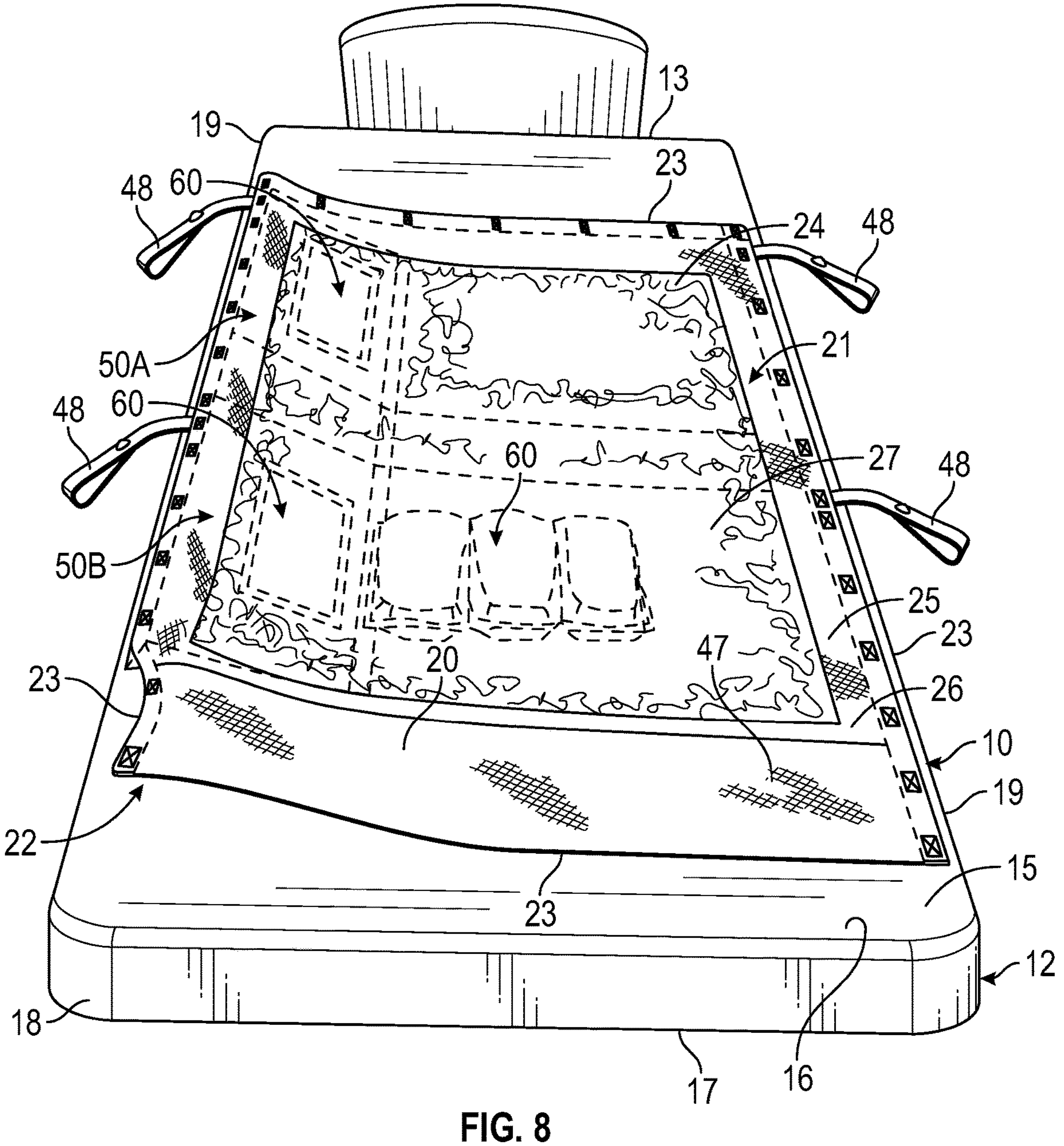
FIG. 8 is a top view of a sheet, wedges, and a support of the system of FIG. 1, according to an exemplary embodiment.
Figure 9A:
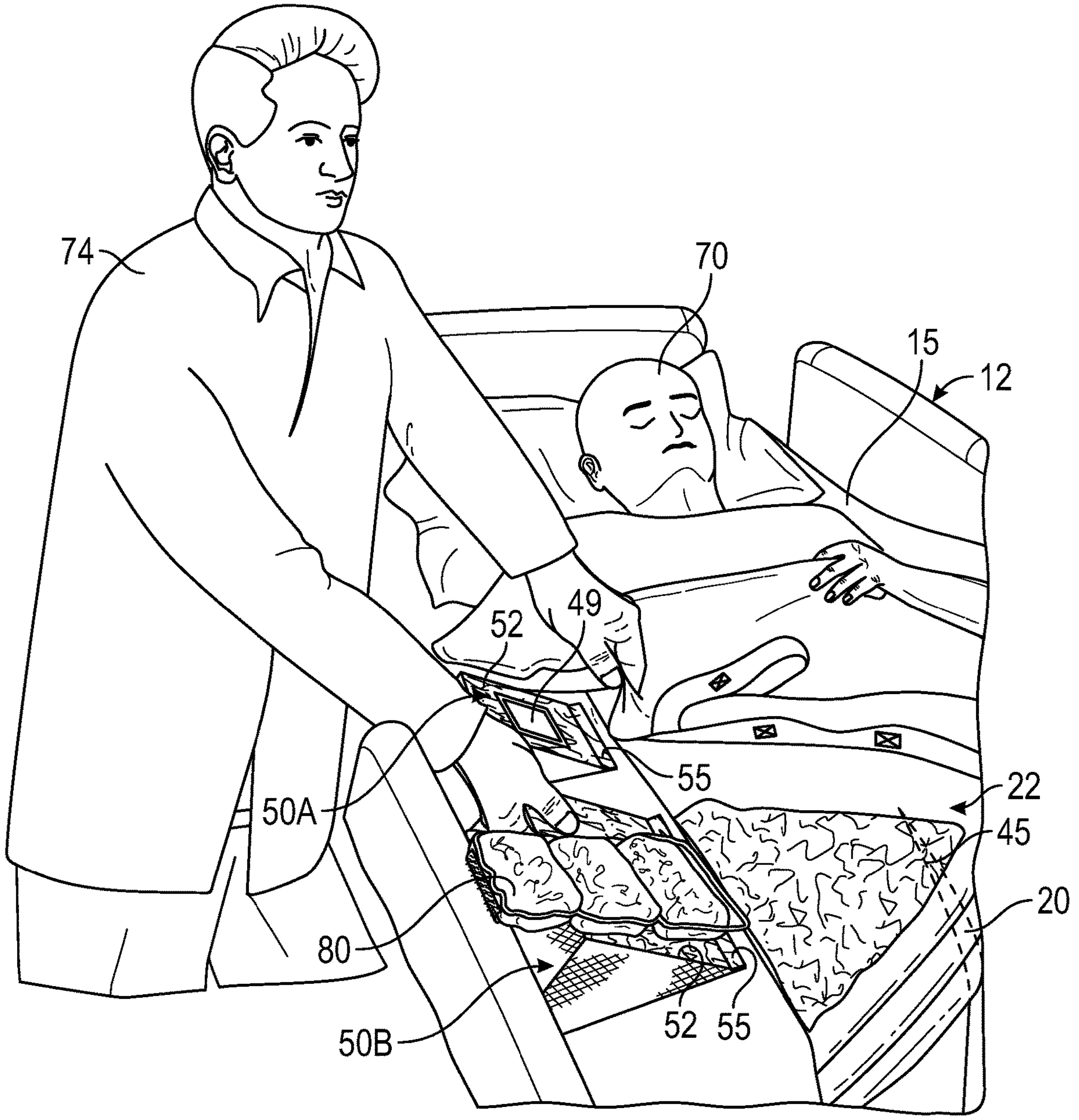
FIGS. 9A-D are a sequential series of views illustrating a method of turning a patient to an angled resting position utilizing the system of FIG. 1, according to an exemplary embodiment.
Figure 9B:
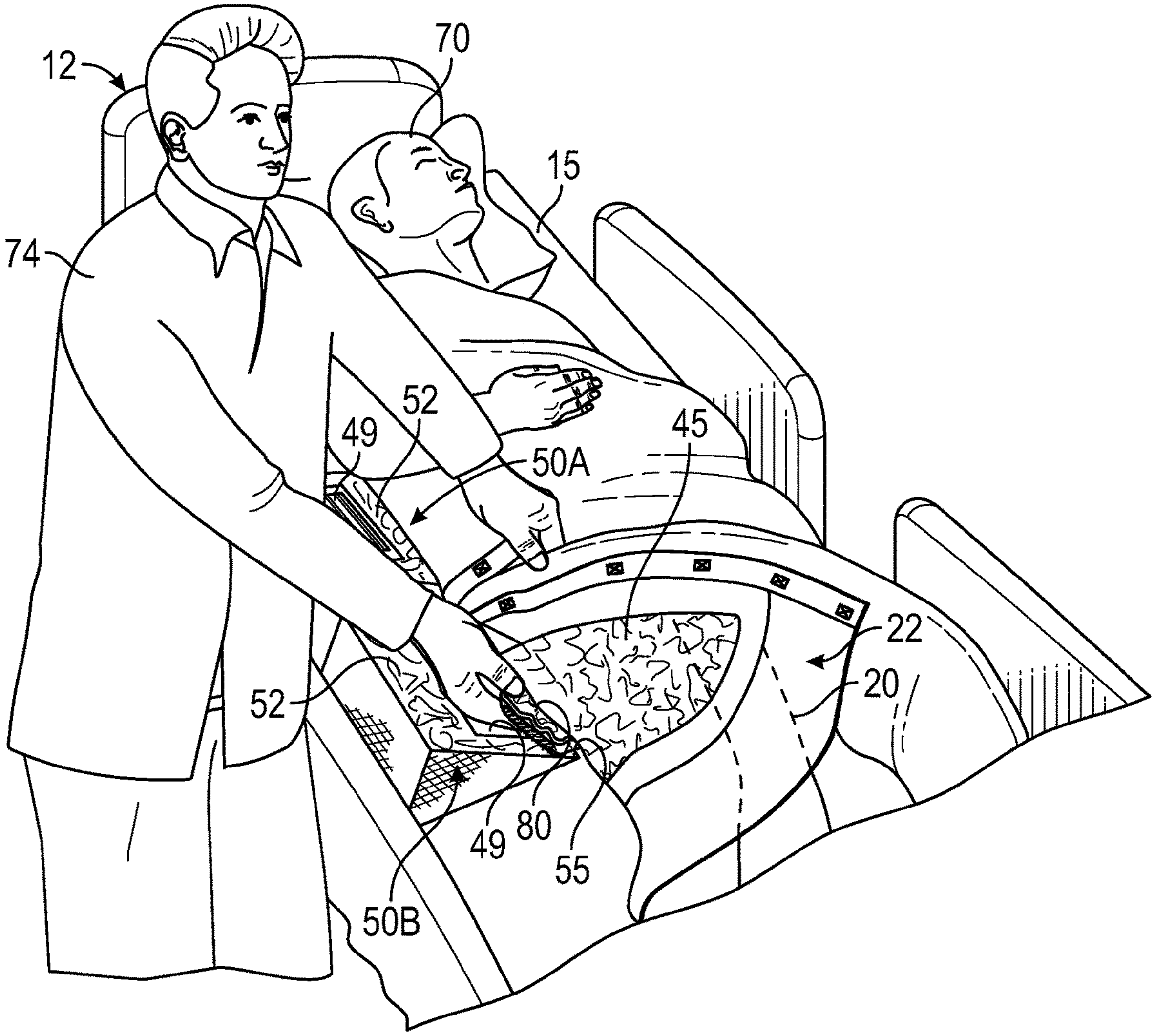
Figure 9C:
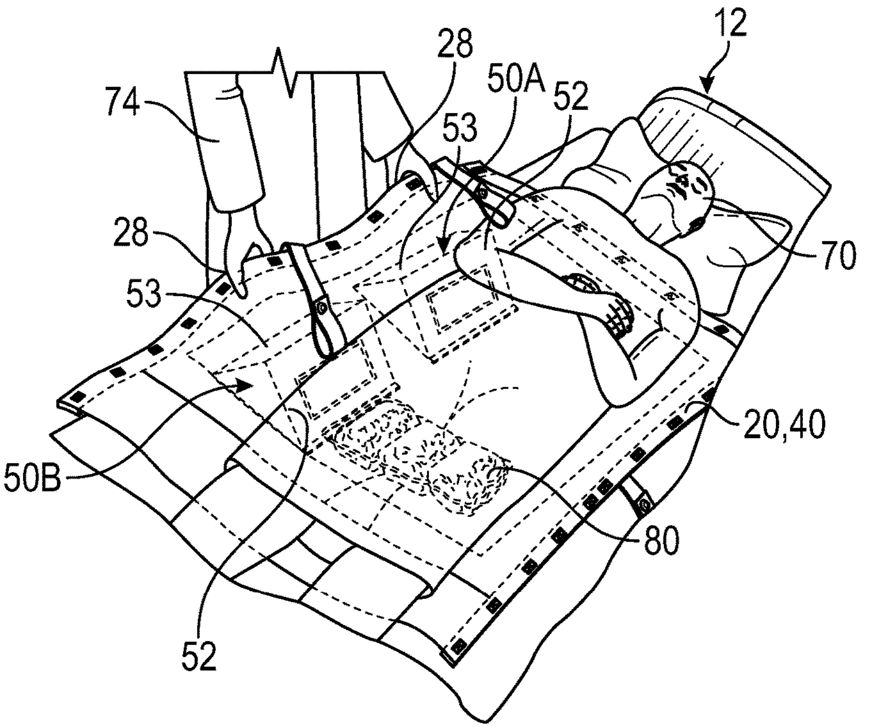
Figure 9D:
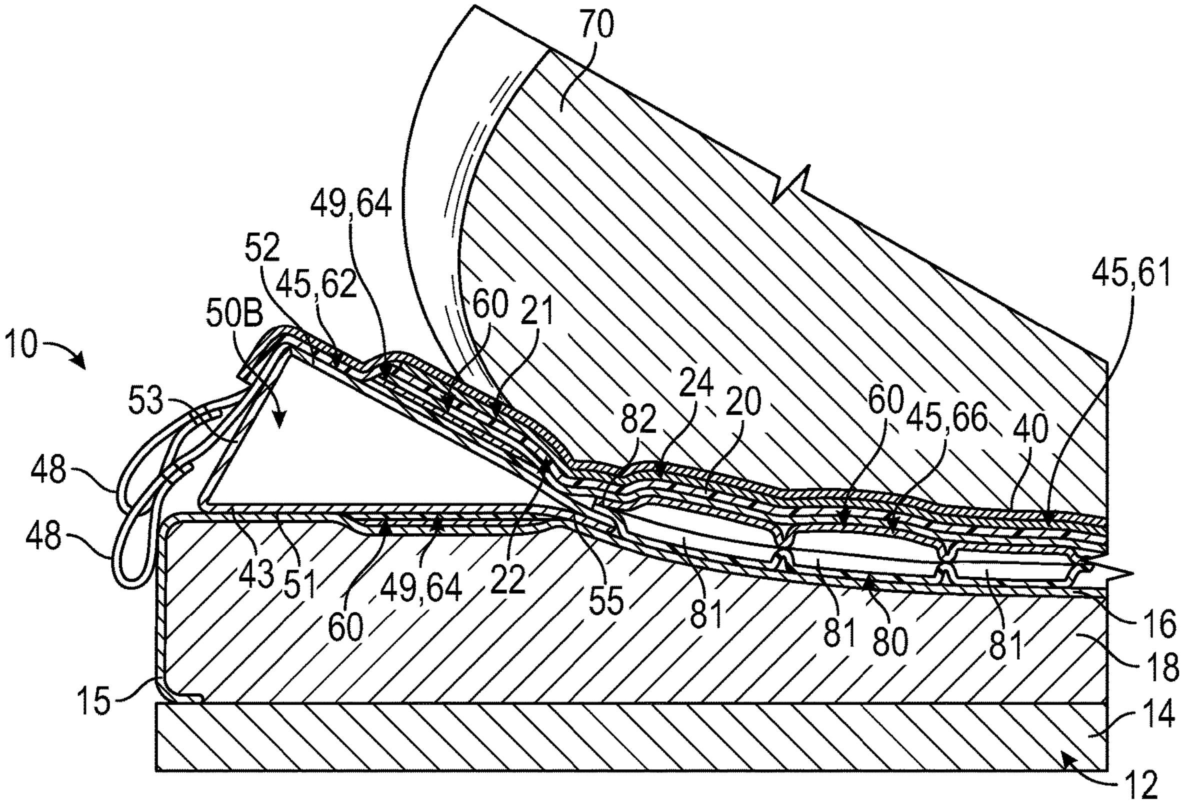

As shown in FIGS. 8-9*d,* the system 10 is configured to be placed on a bed 12 or other support apparatus for supporting a person in a supine position. The bed 12 generally includes a frame 14 and a supporting surface 16 supported by the frame 14, as shown in FIGS. 8-9*d*. The supporting surface 16 can be provided by a mattress 18 or similar structure.

In example embodiments described herein, the apparatus 10 has one or more selective gliding assemblies 60 positioned between components of the apparatus 10 to permit sliding of the components relative to each other in certain directions and to resist sliding of the components relative to each other in at least one direction. The selective gliding assemblies 60 are formed by one or more directionally-oriented engagement members positioned between the components and configured to engage the components to permit and limit sliding in specified directions.

Figure 11:
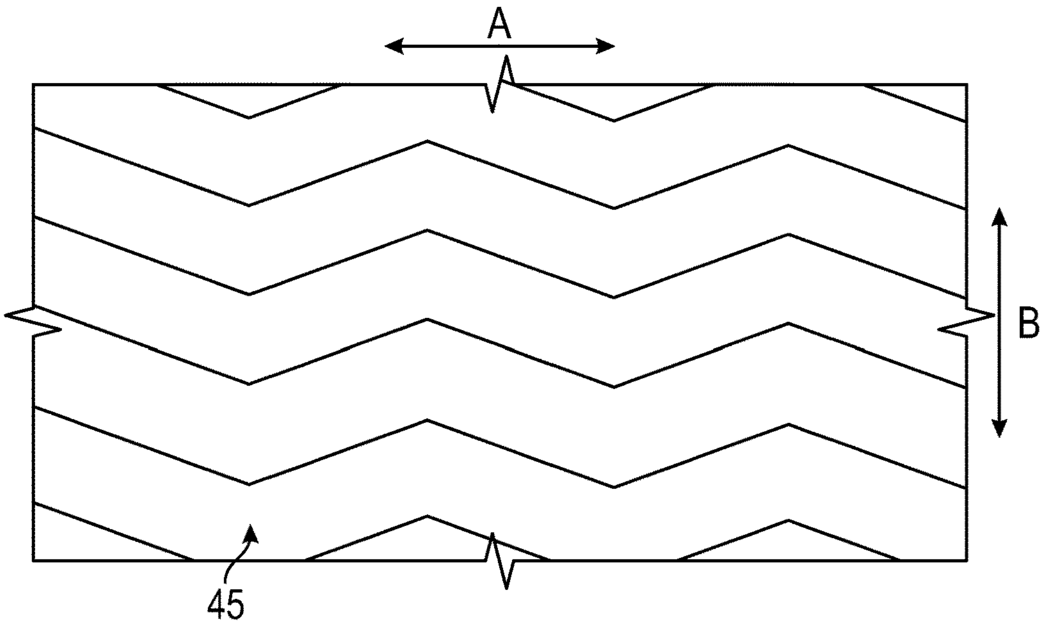
FIG. 11 is a schematic plan view of one engagement member of a selective glide assembly of the system of FIG. 1, according to an exemplary embodiment.

One type of engagement member that is usable in connection with the apparatus 10 is a stitched material 45 with a directional stitching pattern that extends along a particular direction, such as a herringbone or zig-zag stitching pattern (see FIG. 11), to assist in allowing the engagement member to glide along one axis and to resist gliding along another axis. The directional stitching material 45 as shown in FIG. 11 permits sliding in directions generally along the axis A, or in other words, along the directions in which the stitching pattern extends. The directional stitching material 45 as shown in FIG. 11 resists sliding in directions generally along the axis B, or in other words, across the stitches and/or transverse to the directions in which the stitching pattern extends.

Figure 10:
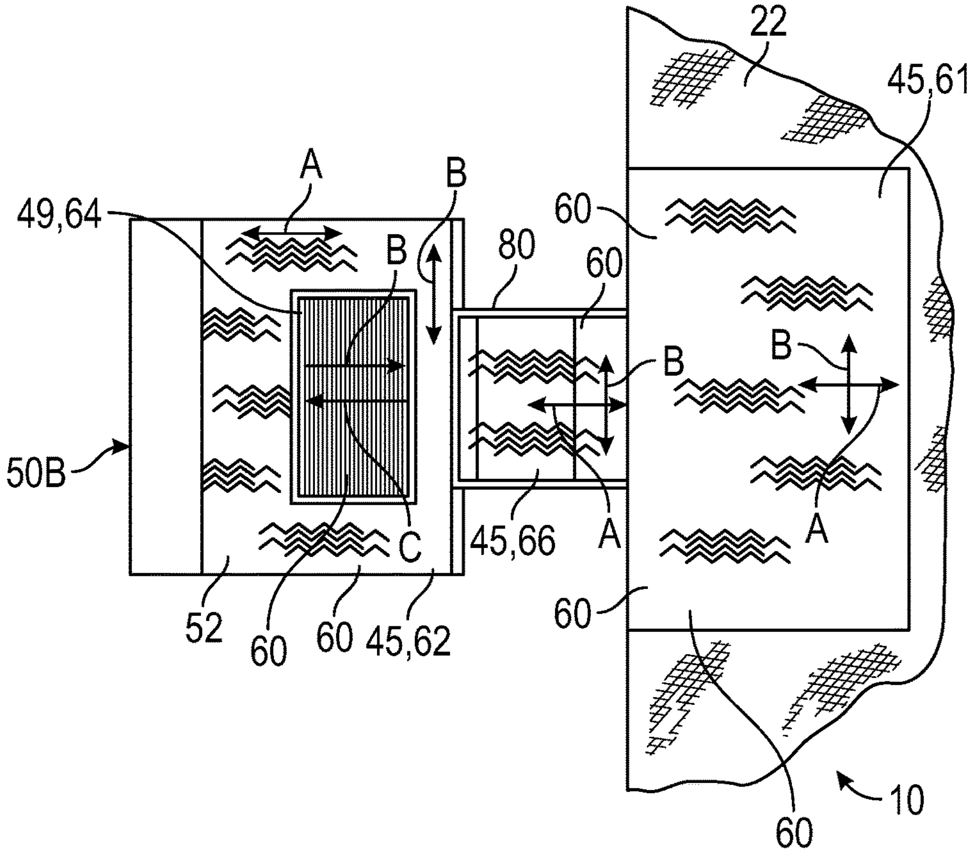
FIG. 10 is a schematic plan view of various selective glide assemblies of the system of FIG. 1, with arrows schematically illustrating directions of free movement and directions of resistance to movement between the components of the system, according to an exemplary embodiment.

Another type of engagement member that is usable in connection with the apparatus 10 is a directional glide material, such as a brushed fiber material or other brushed fabric material, which may have fibers that lie facing a specific direction. In general, a directional glide material resists gliding in a single direction and permits relatively free gliding in the opposite direction and along an axis perpendicular to the single direction, such that the resistance to gliding in the single direction is significantly higher than any of these three other directions identified. Additionally, a directional glide material may have structural characteristics to create this resistance and freedom for gliding in specific directions, such as structural elements that are directionally oriented. This directional glide material can be used in connection with a directional stitching material 45 as shown in FIG. 10 to create a selective gliding assembly 60 with a "one-way" glide arrangement. This arrangement allows the engagement members to glide with the grain of the directional glide material, while resisting gliding in other directions, including the opposite direction along the same axis as the gliding direction.

As described herein with respect to the embodiment of FIGS. 1-8, the apparatus may use selective gliding assemblies 60 to create directional gliding between the wedges 50 and the underside of the sheet 20, between the wedges 50 and the bed 12, and between the support 80 and the underside of the sheet 20. In other embodiments, selective gliding assemblies 60 may be used to create directional gliding between one or more of the above sets of components and/or between one or more other components of the apparatus 10.

Figure 2:
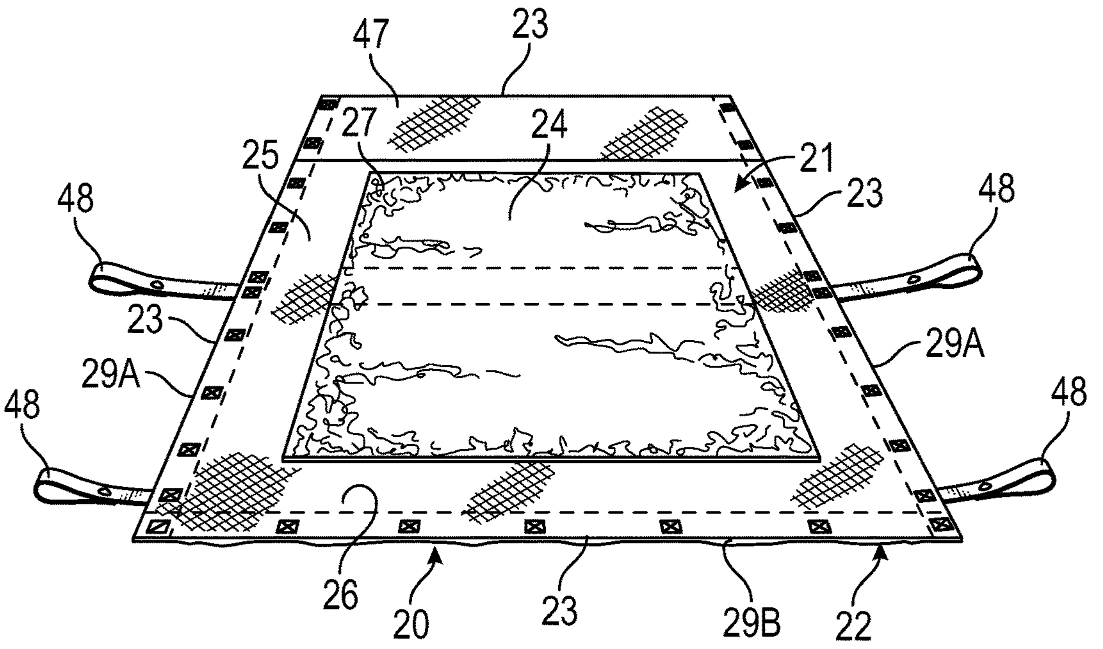
FIG. 2 is a top elevation view of a flexible sheet of the system of FIG. 1, according to an exemplary embodiment.
Figure 3:
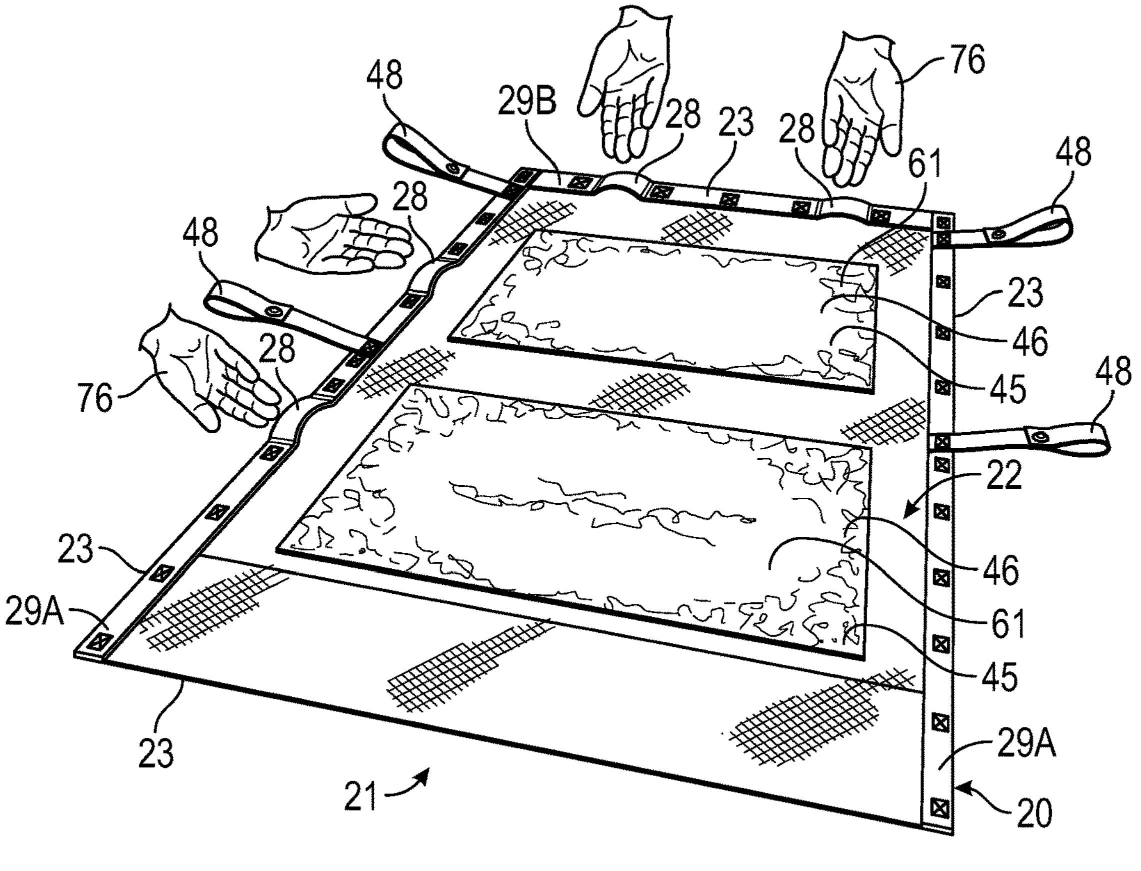
FIG. 3 is a bottom perspective view of the flexible sheet of FIG. 2, according to an exemplary embodiment.
Figure 4:
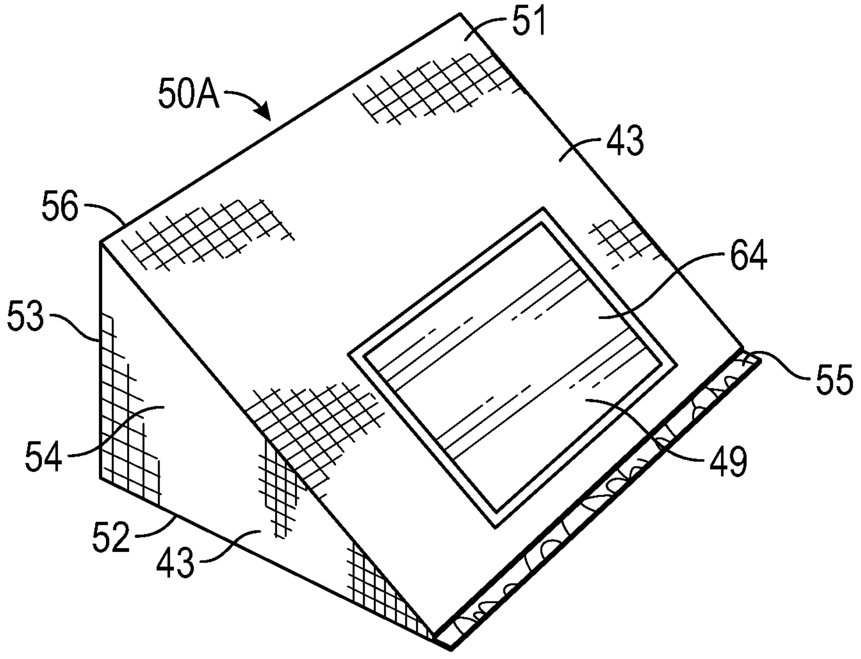
FIG. 4 is a bottom perspective view of a wedge of the system of FIG. 1, according to an exemplary embodiment.
Figure 5:
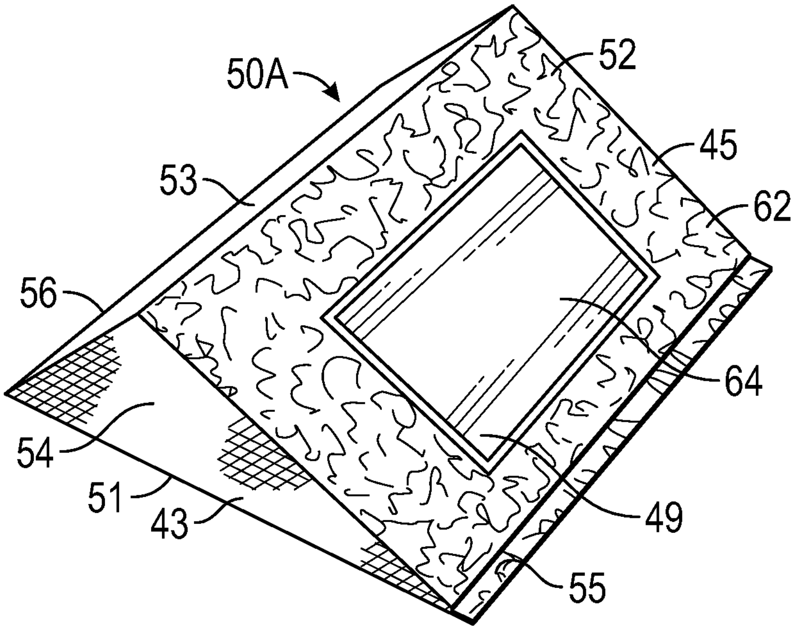
FIG. 5 is a top perspective view of the wedge of FIG. 4, according to an exemplary embodiment.
Figure 6:
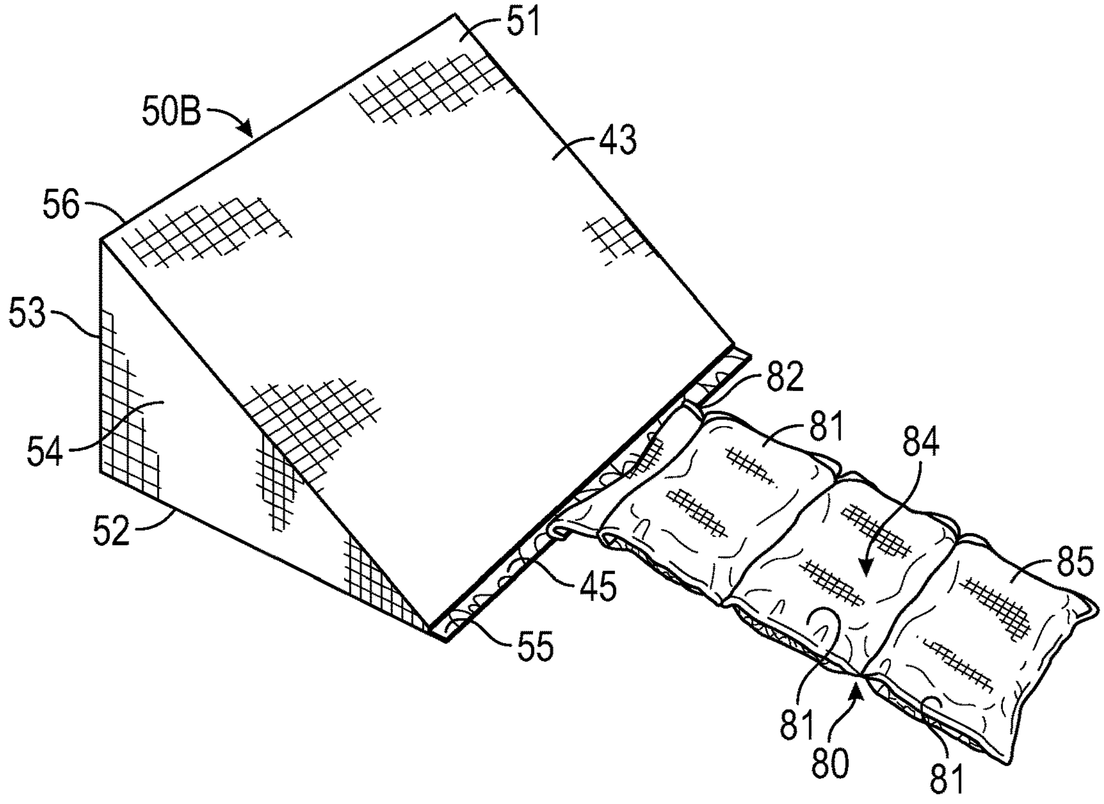
FIG. 6 is a bottom perspective view of a wedge and support of the system of FIG. 1, according to an exemplary embodiment.
Figure 7:
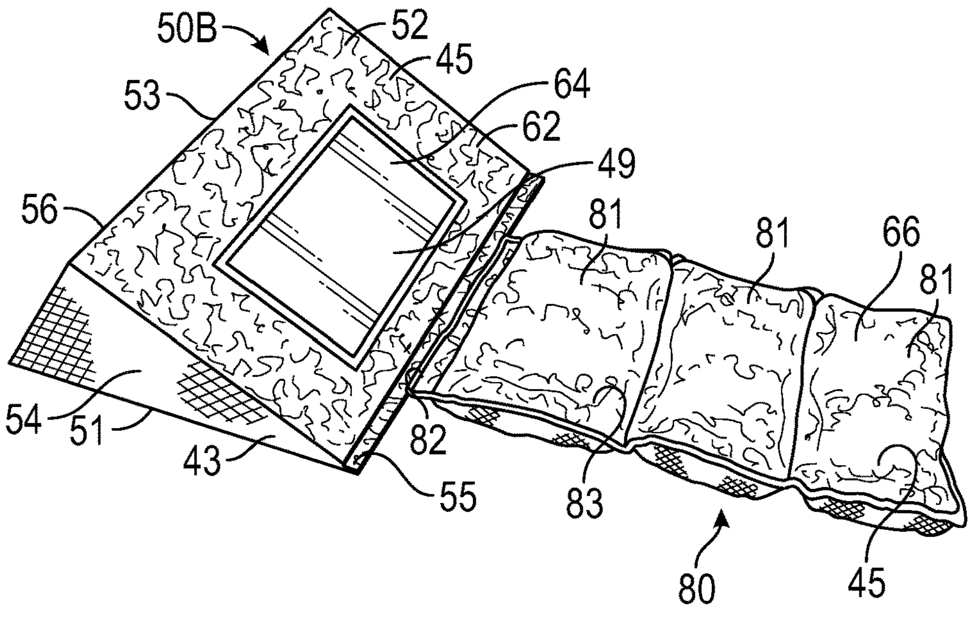
FIG. 7 is a top perspective view of the wedge and support of FIG. 6, according to an exemplary embodiment.

An example embodiment of the sheet 20 of the apparatus is shown in greater detail in FIGS. 2-3. In general, the sheet 20 is flexible and foldable, and has a top surface 21 and a bottom surface 22 defined by a plurality of peripheral edges 23. The sheet 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet 15 as described above. Likewise, "facing" or "confronting" does not imply direct contact or engagement, and may include one or more structures located between the surface and the structure it is confronting or facing.

As seen in FIGS. 2-3, the sheet 20 in this embodiment is rectangular, having four peripheral edges 23, but could be a different shape in other embodiments. The top surface 21 has at least a portion formed of a high-friction or gripping material 24, and the bottom surface 22 has at least a portion formed of a directional stitching material 45. In this embodiment, the sheet includes a first piece 26 of sheet material that is formed partially or entirely of a low-friction material 25, with a second piece 27 of sheet material that is formed partially or entirely of the high-friction material 24, with the second piece 27 connected to the first piece 26 in a surface-to-surface, confronting relation to form a layered structure. The sheet 20 further has one or more additional pieces 46 of sheet material that is formed partially or entirely of the directional stitching material 45. As illustrated in FIGS. 2-3, the first piece 26 is larger than the second piece 27, so that the first piece 26 forms portions of both the top and bottom surfaces 21, 22 of the sheet 20, and the second piece 27 forms at least a portion of the top surface 21, with the edges of the second piece 27 being recessed from the edges 23 of the sheet 20. Additionally, the one or more additional pieces 46 form at least a portion of the bottom surface 22 of the sheet 20, with the edges of the additional pieces 46 being recessed from the edges 23 of the sheet. In the embodiment of FIGS. 2-3, the sheet 20 has two additional pieces 46 that are positioned on the bottom surface 22 and are spaced from each other. The second piece 27 may form at least a majority portion of the top surface 21, and/or the additional piece(s) 46 may form at least a majority portion of the bottom surface 22, in various embodiments. In other words, in this embodiment, the sheet 20 is primarily formed by the first piece 26, with the second piece 27 and additional piece(s) 46 connected to the first piece 26 to form at least a part of the top and bottom surfaces 21. In another embodiment, the first piece 26 may form at least a majority portion of the top and/or bottom surfaces 21, 22. The pieces 26, 27, 46 are connected by stitching in one embodiment, but may have additional or alternate connections in other embodiments, including adhesives, sonic welding, heat welding and other techniques, including techniques familiar to those skilled in the art.

The low-friction material 25 and/or the high-friction material 24 may be formed by multiple pieces in other embodiments. For example, the first piece 26 made of the low-friction material 25 may have a plurality of strips or patches of the high-friction material 24 connected on the top surface 21 in one embodiment. In a further embodiment, the high friction material 24 may be or include a coating applied to the low friction piece 26, such as a spray coating. As described in greater detail below, the low-friction material 25 permits sliding of the sheet 20 in contact with the supporting surface 16 of the bed 12, which may include a fitted bed sheet 15 or other sheet, and the high-friction material 24 provides increased resistance to slipping or sliding of the patient and/or the body pad 40 on which the patient may be lying, in contact with the sheet 20.

As shown in the embodiment in FIGS. 1-8, the first piece 26 is made substantially entirely of the low-friction material 25. In one embodiment, the low-friction material 25 is at least partially made from polyester and/or nylon (polyamide), although other materials can be used in addition to or instead of these materials. In one embodiment, the high friction material 24 is a knitted material, which can enhance comfort, and may be made of polyester and/or another suitable material. The material 24 can then be treated with a high friction substance, such as a hot melt adhesive or appropriate plastic, which can be applied as a discontinuous coating to promote breathability. The high-friction and/or low-friction materials 24, 25 can also be treated with a water repellant, such as polytetrafluoroethylene (PTFE). In other embodiments, the high-friction and/or low-friction materials 24, 25 may include any combination of these components, and may contain other components in addition to or instead of these components. Additionally, both the first and second pieces 26, 27 may be breathable in one embodiment, to allow passage of air, heat, and moisture vapor away from the patient.

Generally, the high friction material 24 has a coefficient of friction that is higher than the coefficient of friction of the low friction material 25. In one embodiment, the coefficient of friction for the high friction material 24 is about 8-10 times higher than the coefficient of friction of the low friction material 25. In another embodiment, the coefficient of friction for the high friction material 24 is between 5 and 10 times higher, or at least 5 times higher, than the coefficient of friction of the low friction material 25. The coefficient of friction, as defined herein, can be measured as a direct proportion to the pull force necessary to move either of the materials 24, 25 in surface-to-surface contact with the same third material, with the same normal force loading.

Additionally, the coefficient of friction of the interface between the high-friction material 24 and the pad 40 is greater than the coefficient of friction of the interface between the low friction material 25 and the bed sheet 15 or supporting surface 16. In one embodiment, the coefficient of friction for the interface of the high friction material 24 is about 8-10 times higher than the coefficient of friction of the interface of the low friction material 25. In another embodiment, the coefficient of friction for the interface of the high friction material 24 is between 5 and 10 times higher, or at least 5 times higher, than the coefficient of friction of the interface of the low friction material 25. It is understood that the coefficient of friction for the interface could be modified to at least some degree by modifying factors other than the sheet 20.

The sheet 20 has one or more engagement members 61 of a selective gliding assembly 60 on the bottom surface 22, to permit movement of the sheet 20 in desired directions and resist movement of the sheet 20 in undesired directions. In the embodiment of FIGS. 1-8, the sheet 20 has two engagement members 61 formed as separate patches of directional stitching material 45 (which may be referred to as "sheet engagement members"). In this embodiment, the axis B (along which gliding is resisted) is oriented to extend between the top and bottom edges 23 and parallel to the side edges 23, and the axis A (along which gliding is allowed) is oriented to extend between the side edges 23 and parallel to the top and bottom edges 23. Relative to the wedge 50A-B, the axis B is oriented to extend parallel to at least one of the apex 55 and the back wall 53 of the wedge and/or between the side walls 54, and the axis A is oriented to extend between the apex and the back wall of the wedge and/or parallel to the side walls 54. This arrangement is illustrated schematically in FIG. 10. In another embodiment, the engagement members 61 may be formed as a single, larger patch or a larger number of patches of the directional stitching material 45. In a further embodiment, one or more of the engagement members 61 may be formed of a different directionally-oriented material, and/or may be oriented to allow/resist gliding in different directions. For example, if both of the engagement members 61 as depicted in FIGS. 1-8 are turned 90°, then movement in a direction extending between the side edges 23 and parallel to the top and bottom edges 23 would be resisted, and movement in a direction extending between the top and bottom edges 23 and parallel to the side edges 23 would be allowed.

In one embodiment, as illustrated in FIGS. 1-8, the sheet 20 may also include one or more handles 28, 48 to facilitate pulling, lifting, and moving the sheet 20. As shown in FIGS. 2-3, the sheet 20 has handles 28 formed by strips 29A-B of a strong material that are stitched in periodic fashion to the bottom surface 22 at or around both side edges 23 of the sheet 20, as well as the top edge 23 of the sheet. The non-stitched portions can be separated slightly from the sheet 20 to allow a user's hands 76 to slip underneath, and thereby form the handles 28, as shown in FIG. 3. The handles 28 formed by the strips 29A on the side edges 23 of the sheet 20 are useful for pulling the sheet 20 laterally, to move the patient 70 laterally on the bed 12. The sheet 20 may also include handles 48 in the form of straps that are stitched to the bottom surface 22 of the sheet 20 and extend from the sheet 20. The handles 28 formed by the strip 29B on the top edge 23 of the sheet 20 may also be useful for boosting the patient 70 as well. For example, the handles 28 on the top edge 23 of the sheet 20 may be useful when a single caregiver is gripping the sheet to boost the patient 70. It is understood that the handles 28 formed by strips 29A on the side edges 23 of the sheet 20 can also be used for "boosting" the patient 70. Additionally, any of the handles 28, 48 may be used for rolling the patient right or left, such as in FIGS. 9*a-b*. The sheet 20 in FIGS. 1-8 includes four handles 48, but in other embodiments, a larger or smaller number of handles 48 may be used. In other embodiments, the sheet 20 may include a different number or configuration of the handles 28, 48 as described above. Further, the handles 28 may be connected to the sheet 20 in a different way, such as by heat welding, sonic welding, adhesive, etc. Other types of handles may be utilized in further embodiments.

In further embodiments, the sheet 20 and the components thereof may have different configurations, such as being made of different materials or having different shapes and relative sizes. For example, in one embodiment, the low-friction material 25 and the high-friction material 24 may be made out of pieces of the same size. In another embodiment, the low-friction material 25 and the high-friction material 24 may be part of a single piece that has a portion that is processed or treated to create a surface with a different coefficient of friction. As an example, a single sheet of material could be treated with a non-stick coating or other low-friction coating or surface treatment on one side, and/or an adhesive or other high-friction coating or surface treatment on the other side. In additional embodiments, the low-friction material 25, the high-friction material 24, and the wipeable material 47 may occupy different portions of the sheet 20, or one or more of these materials may not be present. Still other embodiments are contemplated within the scope of the invention.

The body pad 40 is typically made from a different material than the sheet 20 and contains an absorbent material, along with possibly other materials as well. The pad 40 provides a resting surface for the patient, and can absorb fluids that may be generated by the patient. The pad 40 may also be a low-lint pad, for less risk of wound contamination, and is typically disposable and replaceable, such as when soiled. The top and bottom surfaces 42, 44 may have the same or different coefficients of friction. Additionally, the pad 40 illustrated in the embodiments of FIGS. 1 and 10 is approximately the same size as the sheet 20, and both the sheet 20 and the pad 40 are approximately the same width as the bed 12 so that the edges 23 of the sheet 20 and the edges of the pad 40 are proximate the side edges of the bed 12, but may be a different size in other embodiments.

In one embodiment, the pad 40 may form an effective barrier to fluid passage on one side, in order to prevent the sheet 20 from being soiled, and may also be breathable, in order to permit flow of air, heat, and moisture vapor away from the patient and lessen the risk of pressure ulcers (bed sores). The sheet 20 may also be breathable to perform the same function, as described above.

The system 10 may include one or more wedges 50A-B that can be positioned under the sheet 20 to provide a ramp and support to slide and position the patient slightly on his/her side, as described below. FIGS. 4-7 illustrate example embodiments of wedges 50A-B that can be used in conjunction with the system 10. The wedge 50A-B has a body 56 that can be triangular in shape, having a base wall or base surface 51, a ramp surface 52 that is positioned at an oblique angle to the base wall 51, a back wall 53, and side walls 54. In this embodiment, the base wall 51 and the ramp surface 52 meet at an oblique angle to form an apex 55, and the back wall 53 is positioned opposite the apex 55 and approximately perpendicular to the ramp surface 52. The apex 55 may be the smallest angle of any of the corners of the wedge 50A-B, in one embodiment. The side walls 54 in this embodiment are triangular in shape and join at approximately perpendicular angles to the base wall 51, the ramp surface 52, and the back wall 53. In this embodiment, the surfaces 51, 52, 53, 54 of the wedge body 56 are all approximately planar when not subjected to stress, but in other embodiments, one or more of the surfaces 51, 52, 53, 54 may be curved or rounded. Any of the edges between the surfaces 51, 52, 53, 54 of the wedge body 56 may likewise be curved or rounded, including the apex 55.

The wedge body 56 in this embodiment is at least somewhat compressible or deformable, in order to provide greater patient comfort and ease of use. Any appropriate compressible material may be used for the wedge body 56, including various polymer foam materials, such as a polyethylene and/or polyether foam. A particular compressible material may be selected for its specific firmness and/or compressibility, and in one embodiment, the wedge body 56 is made of a foam that has relatively uniform compressibility.

The wedge 50A-B is configured to be positioned under the sheet 20 and the patient, to position the patient at an angle, as described in greater detail below. In this position, the base wall 51 of the wedge 50A-B faces downward and engages or confronts the supporting surface 16 of the bed 12, and the ramp surface 52 faces toward the sheet 20 and the patient and partially supports at least a portion of the weight of the patient. The angle of the apex 55 between the base wall 51 and the ramp surface 52 influences the angle at which the patient is positioned when the wedge 50A-B is used. In one embodiment, the angle between the base wall 51 and the ramp surface 52 may be up to 45°, or between 15° and 35° in another embodiment, or about 30° in a further embodiment. Positioning a patient at an angle of approximately 30° is currently clinically recommended, and thus, a wedge 50A-B having an angle of approximately 30° may be the most effective for use in positioning most immobile patients. Thus, when these embodiments of wedges 50A-B are used in connection with the method as shown in FIGS. 9A-D, the patient 70 need not be rotated or angled more than 45°, 35°, or 30°, depending on the wedge 50A-B configuration. If clinical recommendations change, then a wedge 50A-B having a different angle may be considered to be the most effective. The wedge 50A-B may be constructed with a different angle as desired in other embodiments. It is understood that the sheet 20 may be usable without the wedges 50A-B, or with another type of wedge, including any commercially available wedges, or with pillows in a traditional manner. For example, the sheet 20 may be usable with a single wedge 50A-B having a greater length, or a number of smaller wedges 50A-B, rather than two wedges 50A-B, in one embodiment. As another example, two wedges 50A-B may be connected together by a narrow bridge section or similar structure in another embodiment. It is also understood that the wedge(s) 50A-B may have utility for positioning a patient independently and apart from the sheet 20 or other components of the system 10, and may be used in different positions and locations than those described and illustrated herein.

In one embodiment, the wedges 50A-B may have a directionally-oriented material (e.g., a directional stitching material 45, directional glide material, etc.) covering at least a portion of the ramp surface 52, and potentially other surfaces as well. In the embodiments illustrated in FIGS. 4-7, the wedges 50A-B have the directional stitching material 45 covering the ramp surface 52. In another embodiment, the directional stitching material 45 may additionally or alternately cover the base wall 51, the back wall 53, and/or the side walls 54. The directional stitching material 45 in this embodiment forms an engagement member 62 (which may be referred to as a "ramp engagement member"), of a selective gliding assembly 60 on at least the ramp surface 52.

In the embodiments illustrated in FIGS. 4-7, the wedges 50A-B also have engagement members 64 in the form of patches of a directional glide material 49 located on one or more surfaces. The wedge 50A illustrated in FIGS. 4-5 has engagement members 64 of the directional glide material 49 located on the ramp surface 52 and the base wall 51 (which may also be referred to as a "ramp engagement member" and a "base engagement member," respectively). The wedge 50B illustrated in FIGS. 6-7 has an engagement member 64 of the directional glide material 49 located on the ramp surface 52.

In the embodiments illustrated in FIGS. 4-7, the patches of the directional glide material 49 covered only a portion of the surfaces 51, 52 on which they were located, such that the edges of the directional glide material 49 are spaced from the edges of the respective surfaces on which they are located. In this configuration, the amount of the directional glide material 49 is sufficient to provide good resistance to unwanted slipping, but is not excessively expensive and leaves part of the directional stitching material 45 on the ramp surface 52 exposed to provide further functionality. Further, each of the patches of the directional glide material 49 may be connected to the wedge 50A-B by stitching, adhesive or other bonding, and/or other techniques. The engagement members 64 may have other configurations in other embodiments, including using different types of directionally-oriented materials.

As described herein, the selective gliding assemblies 60 can resist movement in one or more directions and allow free movement in one or more different directions, which may be transverse or opposed to each other. It is understood that the "resistance" to sliding may be expressed using a difference in pull force necessary to create sliding movement between the same pieces of material in different directions. For example, if a selective gliding assembly is considered to "resist" sliding in one direction and "allow" sliding in another direction, this may be determined by having a relatively greater pull force necessary to create sliding movement between two engaging materials in the former direction and a relatively smaller pull force necessary to create sliding movement between the same two materials in the latter direction. The difference in resistance may be expressed quantitatively as well, such as described elsewhere herein. In one embodiment, a selective gliding assembly 60 may resist movement in one direction and may allow movement in another direction that is opposed (i.e., angled 180° to) the first direction. In another embodiment, a selective gliding assembly 60 may resist movement in one direction and may allow movement in another direction angled 90° to the first direction. In a further embodiment, a selective gliding assembly 60 may allow movement in one direction and may resist movement in at least two other directions angled 90° and 180° to the first direction. Still further types of directional gliding assemblies 60 may be constructed using materials as described herein and/or additional materials with directional properties.

In other embodiments, the apparatus 10 may include a different type of supporting device other than the wedges 50A-B illustrated in FIGS. 1-8, such as a different type or configuration of wedge or a different type of supporting device. For example, the wedges 50A-B may be joined together to form a single wedge in one embodiment, which may include a gap at the sacral area. As another example, the apparatus 10 may include a supporting device in the form of a pillow or cushion. It is understood that any supporting device for turning patients 70 that may be included with the apparatus 10 may include any of the features of the wedges 50A-B described herein, including the engagement members 62, 64 for forming selective glide assemblies 60.

The apparatus 10 may further include a support 80 configured to be placed adjacent the sacral area of the patient 70, such as the back of the upper thighs of the patient 70, below the patient's buttocks. The support 80 may be connected to one of the wedges 50A-B. In the embodiment illustrated in FIGS. 1-8, one of the wedges 50B has the support 80 connected proximate the apex 55 and extending outwardly from the apex 55. The support 80 in this embodiment is a pad or pillow that is filled with a fiber fill material, and is divided into three chambers 81, which are formed by stitched boundaries. Additionally, in the embodiment illustrated in FIGS. 1-8, the support 80 is connected to the wedge 50B by a stitched connection 82 at one end. The connection 82 between the support 80 and the wedge 50B allow the components to be handled and inserted simultaneously, avoid possible positioning conflicts between the components, and assist in ensuring that the support is accurately and consistently positioned. In other embodiments, the support 80 may be connected in a different configuration. In further embodiments, the support 80 may not be connected to the wedge 50B at all. The support 80 may be shaped and/or connected differently in further embodiments.

The support 80 may also include an engagement member 66 forming part of a selective gliding assembly 60, such as a directional stitching material 45, a directional gliding material, or other directionally-oriented material. In the embodiment illustrated in FIGS. 1-8, the support 80 has an engagement member 66 on the top surface 83, in the form of a directional stitching material 45 (which may also be referred to as a "support engagement member"). The directional stitching material 45 may generally cover at least a portion of the top surface 83 of the support 80, and in the embodiment illustrated in FIGS. 1-8, the directional stitching material 45 covers all or substantially all of the top surface 83 of the support 80. The engagement member 66 on the top surface 83 of the support 80 is configured to engage the engagement member 61 on the bottom surface 22 of the sheet 20 in order to form a selective gliding assembly 60. In this arrangement, the selective gliding assembly 60 formed by the engagement members 61, 66 resists gliding of the sheet 20 relative to the support 80 along the axis B extending between the top and bottom edges 23 of the sheet 20 and between the head 13 and the foot 17 of the bed. In particular, this arrangement resists sliding of the sheet 20 downward toward the foot 17 of the bed 12 separately from the support 80, which can both retain the support 80 in proper position relative to the patient 70 and resist sliding of the patient 70 downward on the bed 12. This arrangement is illustrated schematically in FIG. 10. The bottom surface 84 of the support 80 is at least partially formed or covered by a low friction material 85, which may be the same low friction material 25 as used in the sheet 20. This low friction material 85 facilitates sliding the support 80 beneath the patient 70, as described herein, and also facilitates the support 80 and the wedge 50B with the sheet 20, such that the sheet 20 and/or the patient 70 do not move relative to the support 80 and the wedge 50B. In another embodiment, at least a portion of the bottom surface 84 may include such an engagement member to resist sliding on the bed 12.

All or some of the components of the system 10 can be provided in a kit, which may be in a pre-packaged arrangement, as described in U.S. Patent Application Publication No. 2012/0186012, published Jul. 26, 2012, which is incorporated by reference herein in its entirety and made part hereof. For example, the sheet 20 and the pad 40 may be provided in a pre-folded arrangement or assembly, with the pad 40 positioned in confronting relation with the top surface 21 of the sheet 20, in approximately the same position that they would be positioned in use, and the sheet 20 and pad 40 can be pre-folded to form a pre-folded assembly 65. The pre-folded assembly 65 can be unfolded when placed beneath a patient. It is understood that different folding patterns can be used. The pre-folded sheet 20 and pad 40 can then be unfolded together on the bed 12, as described below, in order to facilitate use of the system 10. Additionally, the sheet 20 and the pad 40 can be packaged together, by wrapping with a packaging material to form a package, and may be placed in the pre-folded assembly 65 before packaging. The one or more wedges 50 may also be included in the package, in one embodiment. Other packaging arrangements may be used in other embodiments.

FIGS. 9A-D illustrate an example embodiment of a method for placing the patient in an angled resting position by placing two wedges 50A-B and the support 80 under the patient 70. The method is used with a patient 70 lying on a bed 12 as described above, having a bed sheet 15 (e.g., a fitted sheet) on the supporting surface 16, with the sheet 20 and pad 40 of the system 10 lying on top of the bed sheet 15 and the patient 70 lying on the pad 40. In this embodiment, the wedges 50A-B and the support 80 are positioned on top of the bed sheet 15, such that the bed sheet 15 contacts the base wall 51 of the wedge 50A-B and the bottom surface 84 of the support 80, and the ramp surface 52 of the wedge 50A-B and the top surface 83 of the support 80 contact the sheet 20. It is understood that no bed sheet 15 or other cover for the mattress 18 may be present in some embodiments, in which case the wedges 50 can be placed directly on the mattress 18. As shown in FIG. 9*a-b,* the edge of the sheet 20 is lifted, and the wedges 50A-B and the support 80 are inserted from the side of the bed 12 under the sheet 20 toward the patient 70. The support 80 may be inserted by the user 74 grasping the free end (opposite the connection 82), lifting the sheet 20 beneath the patient's thighs, and pushing the support into position, as shown in FIG. 9*b*. At this point, at least the apex 55 of each wedge 50A-B may be pushed toward, next to, or at least partially under the patient 70. The selective gliding assemblies 60 between the wedges 50A-B and the bottom surface 22 of the sheet 20 do not resist such insertion and allow free gliding of the wedge toward the patient and away from the side edge of the bed. This insertion technique may position the patient to the desired angle with no further movement of the patient 70 necessary. In one embodiment, the wedges 50A-B should be aligned so that the wedges are spaced apart with one wedge 50A positioned at the upper body of the patient 70 and the other wedge 50B positioned at the lower body of the patient 70, with the patient's sacral area positioned in the space between the wedges 50A-B. It has been shown that positioning the wedges 50A-B in this arrangement can result in lower pressure in the sacral area, which can reduce the occurrence of pressure ulcers in the patient 70. The wedges 50A-B may be positioned approximately 10 cm apart in one embodiment, or another suitable distance to provide space to float the sacrum, or in other words, to have minimal force on the sacrum. The support 80 is also pushed beneath the upper legs/thighs of the patient 70, downward of the sacral area, and the selective gliding assembly 60 between the support 80 and the bottom surface 22 of the sheet 20 does not resist such insertion.

Once the wedges 50A-B and the support 80 have been inserted, the patient 70 may be in the proper angled position. If the patient 70 requires further turning to reach the desired angled position, the user 74 (such as a caregiver) can pull the patient 70 toward the wedges 50A-B and toward the user 74, such as by gripping the handles 28 on the sheet 20, as shown in FIG. 9*c*. This moves the proximate edge of the sheet 20 toward the back walls 53 of the wedges 50A-B and toward the user 74, and slides the patient 70 and at least a portion of the sheet 20 up the ramp surface 52, such that the ramp surface 52 partially supports the patient 70 to cause the patient 70 to lie in an angled position. During this pulling motion, the selective gliding assemblies 60 between the ramp surfaces 52 of the wedges 50A-B and the sheet 20 do not resist movement of the sheet 20, the engagement member 64 on the base wall 51 of the wedge 50A resists movement of the wedge 50A toward the user 74 (i.e., away from the patient 70 and toward the side edge of the bed 12), and the high friction surface 24 of the sheet 20 resists movement of the pad 40 and/or the patient 70 with respect to the sheet 20.

When the patient 70 is to be returned to lying on his/her back, the wedges 50A-B and the support 80 can be removed from under the patient 70. The sheet 20 may be pulled in the opposite direction in order to facilitate removal of the wedges 50A-B and support 80 and/or position the patient 70 closer to the center of the bed 12. The patient 70 can be turned in the opposite direction by inserting the wedges 50A-B and the support 80 under the opposite side of the bed sheet 15, from the opposite side of the bed 12, and pulling the sheet 20 in the opposite direction to move the patient 70 up the ramp surfaces 52 of the wedges 50A-B and the support 80, in the same manner described above.

Once the wedges 50A-B and the support 80 are positioned beneath the patient 70 and the sheet 70, the various selective gliding assemblies 60 resist undesirable movement of the patient 70 and the sheet 20. For example, the selective gliding assemblies 60 between the ramp surfaces 52 of the wedges 50A-B and the bottom surface 22 of the sheet 20 resist slipping of the sheet 20 down the ramp surfaces 52, and also resist slipping of the sheet 20 downward toward the foot 17 of the bed 12, and further resist slipping of the wedges 50A-B rearward away from the patient 70 and toward the side edge of the bed 12. As another example, the selective gliding assembly 60 on the base wall 51 of the wedge 50A resists slipping of the wedge 50A rearward away from the patient 70 and toward the side edge of the bed 12. As a further example, the selective gliding assembly 60 between the support 80 and the sheet 20 resists slipping of the sheet 20 downward (i.e., toward the foot 17 of the bed 12) with respect to the support 80. Still further, the support 80 may also provide support to the patient 70 to prevent slipping toward the foot 17 of the bed 12. These features in combination provide increased positional stability to the patient 70 as compared to existing turning and/or positioning systems, thereby reducing the frequency and degree of necessary repositioning. The patient 70, the pad 40, the sheet 20, and the wedges 50A-B tend to move "together" on the bed 12 in this configuration, so that these components are not unacceptably shifted in position relative to each other. This, in turn, assists in maintaining the patient 70 in optimal position for greater periods of time and reduces strain and workload for caregivers. To the extent that repositioning is necessary, the handles 28, 48 on the sheet 20 are configured to assist with such repositioning in a manner that reduces strain on caregivers.

Referring generally to FIGS. 12-23, a patient positioning sensor system 200 (hereinafter "PPS system 200") is shown, according to an exemplary embodiment. In an exemplary embodiment, the PPS system 200 is included in the system 10 of FIGS. 1-11 for use in turning and positioning a person resting on a surface. As shown in FIGS. 12-23, the PPS system 200 comprises at least one of a wedge (e.g., with a wedge sensor system), a belt (e.g., with a belt sensor system), and/or a sacral pad (e.g., with a sacral sensor system). The PPS system 200 further incudes a patient management system and a user application. According to an exemplary embodiment, the PPS system 200 is configured to assist a user in positioning a patient, sense early migration of a patient, and/or compliment hospital workflow.

Figure 12:
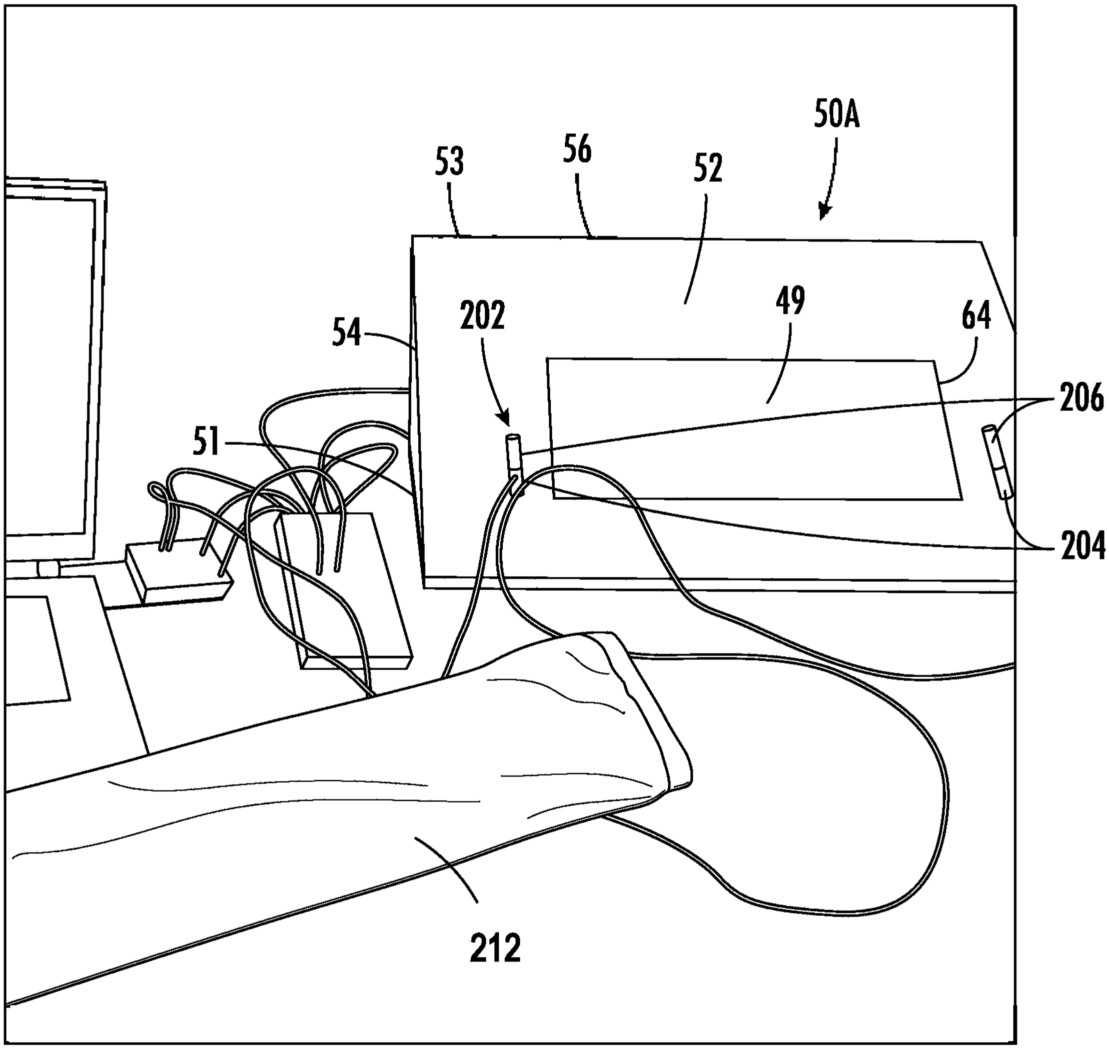
FIG. 12 is a front view of a wedge having a wedge sensor system of the system of FIG. 1, according to an exemplary embodiment.

Referring now to FIG. 12, a wedge having a wedge sensor system of the PPS system 200 is shown, according to an exemplary embodiment. In an exemplary embodiment, the wedge is the one or more wedges 50A-B of FIGS. 1-11. As shown in FIG. 12, and as discussed above, the wedge 50A-B includes the wedge body 56 having the base wall 51, the ramp surface 52 (with the engagement member 64 in the form of the directional glide material 49), the back wall 53, and the side wall 54. According to an exemplary embodiment, the wedge 50A-B also includes a wedge sensor system 202, having a plurality of wedge sensors 204 and an insulating material 206. According to the exemplary embodiment shown in FIG. 12, the wedge sensors 204 are two pressure sensors coupled to the wedge 50A-B (e.g., the ramp surface 52), and are configured to detect pressure applied to the wedge 50A-B (e.g., the weight of a patient against the wedge 50A-B). The wedge sensors 204 may also configured to detect the amount of rotation (e.g., as a result of patient repositioning, etc.) of the wedge 50A-B and/or the wedge sensor system 202. In an exemplary embodiment, the wedge sensors 204 are also coupled to other electronic components (e.g., wires, resisters, circuits, etc.), and are configured to communicate sensor output data to other components of the PPS system 200 (e.g., a processor, a patient management system, a user application, etc.), as discussed below. The insulating material 206 may be formed of any suitable insulating and/or sanitary material (e.g., polyurethane, etc.), and may be surrounding, covering, or otherwise coupled to the wedge sensors 204 and/or the wedge 50A-B (e.g., the ramp surface 52). In an exemplary embodiment, the insulating material 206 is configured to insulate and/or protect the patient from the wedge sensors 204 (and other electronic components), as well as, protect the wedge sensors 204 from an exterior environment (e.g., the directional glide material 49, the patient, etc.). In other embodiments, the wedge sensors 204 are another suitable number of sensors (e.g., three, four, eight, etc.), other suitable sensors (e.g., force resistive sensors, gyroscopes, temperature sensors, etc.), and/or are positioned at other suitable locations on the wedge 50A-B (e.g., the base wall 51, the side wall 54, etc.). In yet other embodiments, the wedge sensors 204 do not include a plurality of sensors; rather, the wedge sensors 204 are a single sensor.

Figure 13:
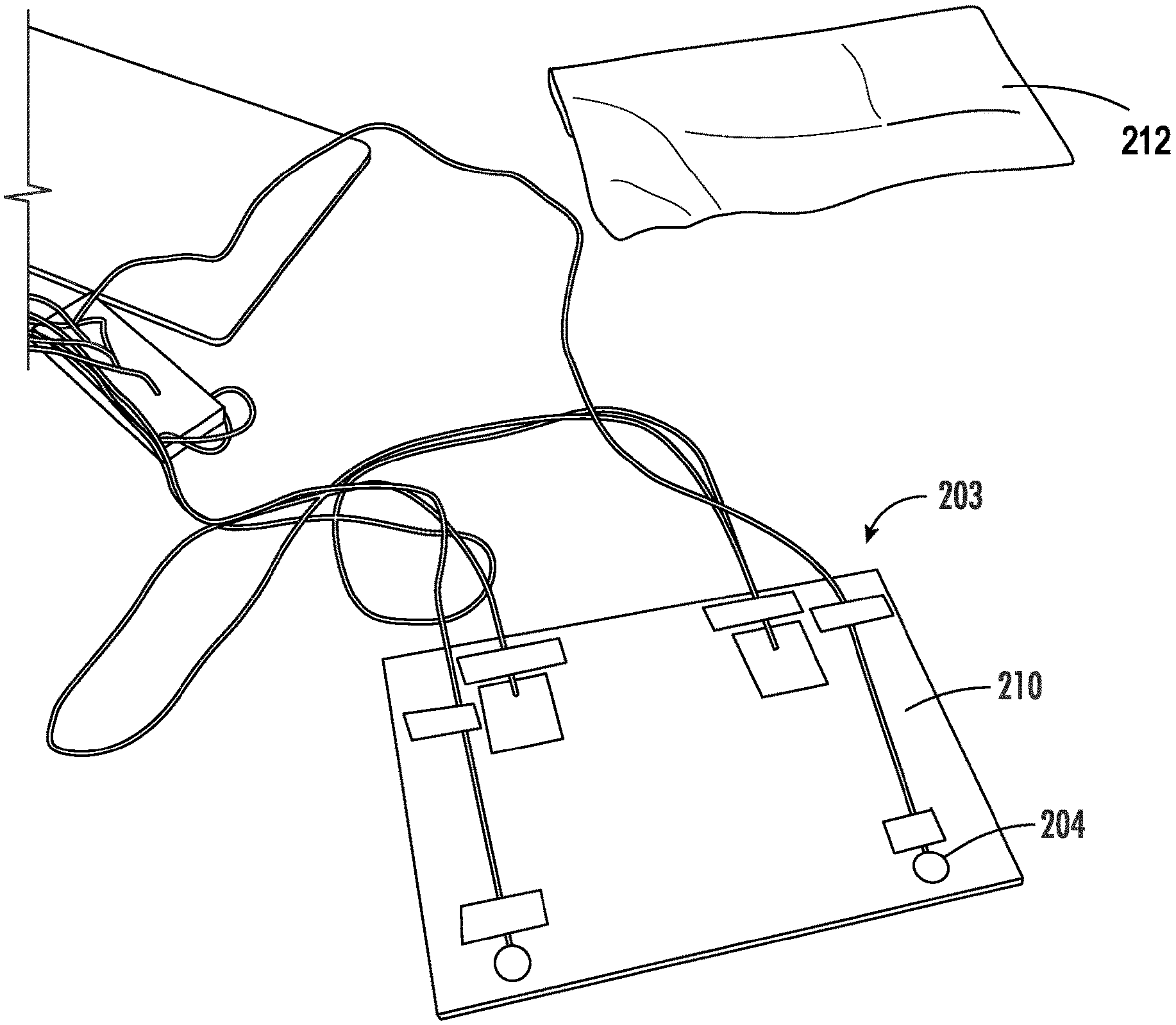
FIG. 13 is a top view of a wedge sensor system of the system of FIG. 1, according to an exemplary embodiment.

Referring now to FIG. 13, a wedge sensor system 203 of the PPS system 200 is shown, according to another exemplary embodiment. In an exemplary embodiment, the wedge sensor system 203 includes the wedge sensors 204, an applicator base 210, and an applicator sleeve 212. According to an exemplary embodiment, the wedge sensors 204 are four pressure sensors, and are coupled to the applicator base 210 at the corners of the applicator base 210. The wedge sensors 204 may also be coupled to other electronic components (e.g., wires, resisters, circuits, etc.), and may be configured to communicate sensor output data to other components of the PPS system 200. In an exemplary embodiment, the applicator base 210 is formed of a suitable insulating and/or sanitary material (e.g., acrylic, carbon fiber, etc.), and is configured be selectively received within the applicator sleeve 212. The applicator sleeve 212 may also be formed of any suitable insulating and/or sanitary material (e.g., polyurethane, polyester, nylon, polyamide, knitted material, polyester, polytetrafluoroethylene (PTFE), etc.), and may be configured to selectively receive the applicator base 210 (and/or the wedge sensors 204). In this regard, the applicator base 210 (and/or the wedge sensors 204) may be selectively received within the applicator sleeve 212 in a first configuration (e.g., for use, etc.), and/or selectively removed from the applicator sleeve 212 in a second configuration (e.g., for cleaning, repair, etc.). The applicator sleeve 212 is configured to protect the applicator base 210 and the wedge sensors 204 from being soiled or damaged, such that the applicator base 210 and the wedge sensors 204 are suitable for multiple uses. Accordingly, the applicator sleeve 212 is configured for single-use, such that it can be discarded and replaced for a different patient and/or when re-positioning the patient. The applicator sleeve 212 may also be cleaned and/or sanitized before re-use.

It should be understood that while FIG. 13 illustrates an exemplary embodiment of the wedge sensor system 203, this is not meant to be limiting and other embodiments are contemplated herein. For example, the wedge sensors 204 may be another suitable number of sensors (e.g., one, two, three, etc. sensor(s)), may be other suitable sensors (e.g., force resistive sensors, gyroscopes, etc.), and/or may be positioned at any other suitable locations on the applicator base 210 (e.g., at the corners, at the center, evenly spaced, spaced around the perimeter, etc.), the applicator base 210 and/or the applicator sleeve 212 may be another suitable shape and/or configuration (e.g., square, circle, a unified component, etc.), etc.

Figure 14:
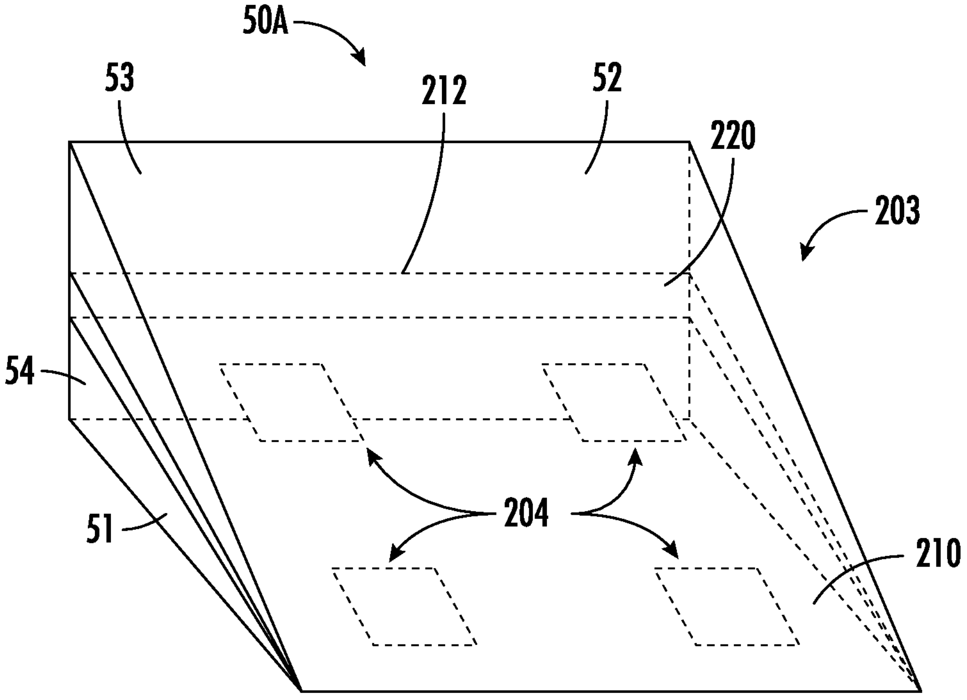
FIG. 14 is a top, front view of a wedge sensor system integrated with a wedge of the system of FIG. 1, according to an exemplary embodiment.
Figure 15:
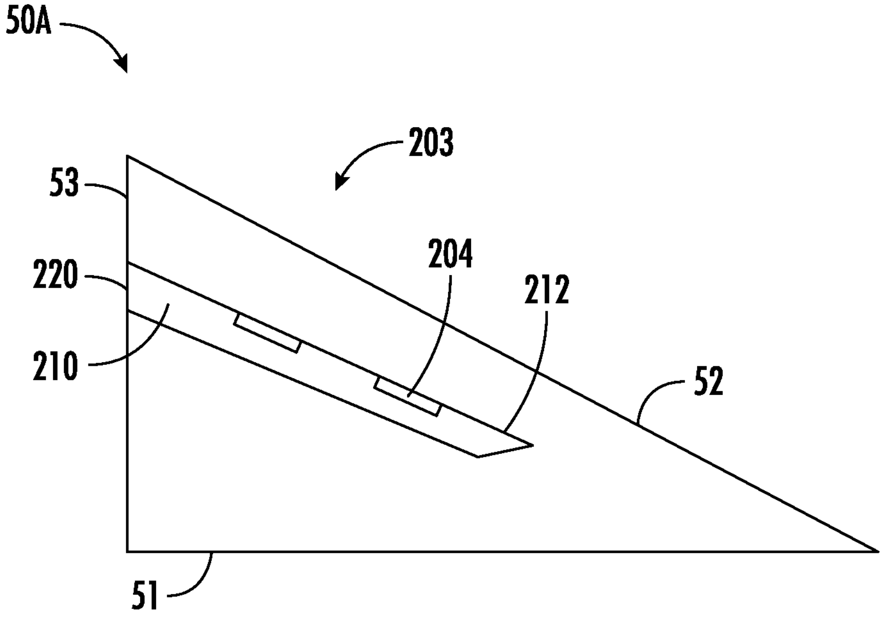
FIG. 15 is a side view of a wedge sensor system integrated with a wedge of the system of FIG. 1, according to an exemplary embodiment.

Referring now to FIGS. 14-15, the wedge sensor system 203 of FIG. 13 is shown being integrated with the wedge 50A-B. As shown in FIGS. 14-15, the wedge 50A-B (having the base wall 51, the ramp surface 52, the back wall 53, and the side wall 54) also includes an applicator slit 220. According to an exemplary embodiment, the applicator slit 220 is a slit (e.g., a void, opening, space, etc.) in the wedge 50A-B, and is configured to selectively receive the wedge sensor system 203 (e.g., the applicator sleeve 212, the applicator base 210, and/or the wedge sensors 204, etc.). In an exemplary embodiment, the applicator slit 220 extends from the back wall 53 toward an apex of the wedge 50A-B (e.g., from a back wall to a front apex of the wedge 50A-B, etc.), and is substantially parallel with the ramp surface 52. In other embodiments, the applicator slit 220 extends vertically downward from the ramp surface 52 toward the base wall 51, and is substantially parallel with the back wall 53. In yet other embodiments, the applicator slit 220 may be configured in anther suitable orientation in/at the wedge 50A-B (e.g., extend vertically downward perpendicular to the ramp surface 52, etc.).

In an illustrative example, the wedge sensor system (e.g., the wedge sensor system 203) is selectively received in the wedge (e.g., the wedge 50A-B). According to an exemplary embodiment, the wedge sensors 204 (and other electronic components) are coupled to the applicator base 210, and received within the applicator sleeve 212. The applicator sleeve 212 may then be received within the applicator slit 220 (e.g., the wedge 50A-B), and positioned within the system 10. In this regard, the wedge 50A-B and the wedge sensor system 203 may be configured to be positioned on a surface (e.g., the supporting surface 16) and/or below a load (e.g., a patient), in order to measure pressure applied to the wedge 50A-B (e.g., the weight of a patient). In some embodiments, sensor output data (e.g., weight measurements of a patient from the wedge sensors 204) may be communicated to other components and/or devices (e.g., a processor, a patient management system, a user application, etc.). According to an exemplary embodiment, the applicator sleeve 212 may also be selectively removed from the applicator slit 220 (e.g., the wedge 50A-B). In this regard, the wedge 50A-B and/or the wedge sensor system 202 may be sanitized, repaired, replaced, and/or modified in another suitable way based on user preferences.

Figure 16:
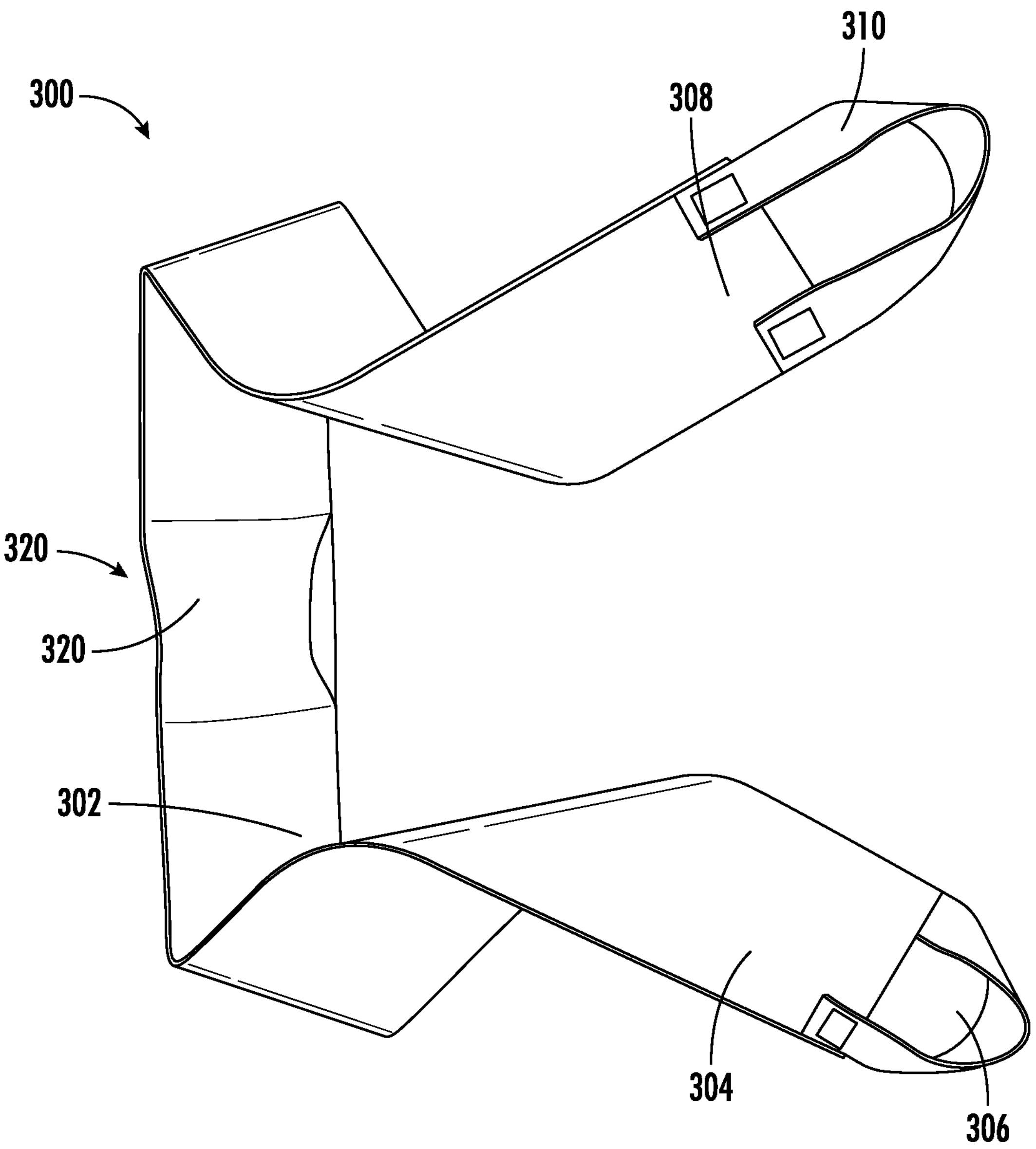
FIG. 16 is a top view of a sensor belt, according to an exemplary embodiment.

Referring now to FIG. 16, a sensor belt of the PPS system 200 is shown, according to an exemplary embodiment. In an exemplary embodiment, the sensor belt (e.g., shown as sensor belt 300) includes a base 302, a first end 304 (having a first handle 306), a second end 308 (having a second handle 310), and a central pocket 312. The sensor belt 300 (e.g., the base 302) may be formed of any suitable flexible and/or breathable material (e.g., polyester, cotton, etc.), and may be configured to be elongated along and/or across a surface (e.g., the sheet 20, the bed 12, the supporting surface 16, etc.). In some embodiments, the sensor belt 300 (e.g., the base 302) includes anti-slip grooves, which are configured to prevent and/or reduce movement of the sensor belt 300 relative to a surface (e.g., the sheet 20, the bed 12, the supporting surface 16, etc.) and/or a patient. In an exemplary embodiment, the first end 304 is coupled to the first handle 306, and the second end 308 is coupled to the second handle 310. The first handle 306 and the second handle 310 may be manipulated (e.g., moved, pulled, repositioned, etc.) in order to adequately position the sensor belt 300 (e.g., the base 302, the central pocket 312, etc.). For example, the first handle 306 and/or the second handle 310 may be manipulated to position the sensor belt 300 within the system 10 (e.g., across the sheet 20, woven into the sheet 20, appropriately beneath a patient, etc.). According to an exemplary embodiment, the central pocket 312 is positioned in the center of the sensor belt 300 (e.g., the base 302), and is configured to house (e.g., hold, support, insulate, etc.) components of a belt sensor system 320.

According to an exemplary embodiment, the belt sensor system 320 includes a plurality of belt sensors 322 and a belt pad 324. In an exemplary embodiment, the belt sensors 322 are a pressure sensor and a gyroscope, and are configured to detect pressure applied (e.g., the weight of a patient on a support surface) to the central pocket 312 and/or the belt sensor system 320. In some embodiments, the belt sensors 322 are also configured to detect the amount of rotation (e.g., as a result of patient repositioning, etc.) of the central pocket 312 and/or the belt sensor system 320. The belt sensors 322 may be coupled to other electronic components (e.g., wires, resisters, circuits, etc.), and may be configured to communicate sensor output data to other components of the PPS system 200 (e.g., a processor, a patient management system, a user application, etc.), as discussed below. In other embodiments, the belt sensors 322 comprise any suitable number of sensors (e.g., one, three, four, etc.), are other suitable sensors (e.g., force resistive sensors, temperature sensor, etc.), and/or are positioned at other suitable locations on the sensor belt 300. According to an exemplary embodiment, the belt pad 324 is formed of a suitable compressible and/or deformable material (e.g., plush, polymer foam, etc.), and is configured to support and/or provide comfort to a patient. In some embodiments, the belt pad 324 is formed of a particularly compressible material for its specific firmness and/or compressibility. In yet other embodiments, the belt pad 324 is formed of foam that has a relatively uniform compressibility.

Figure 17:
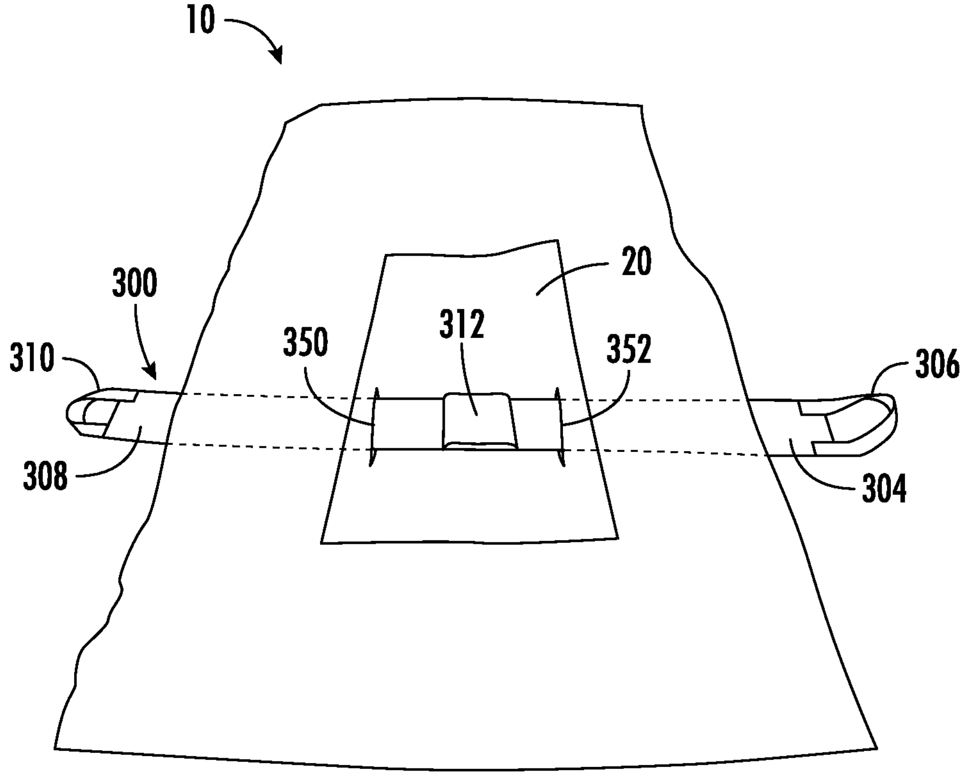
FIG. 17 is a top view of a sensor belt with a patient positioning system of the system of FIG. 1, according to an exemplary embodiment.
Figure 18:
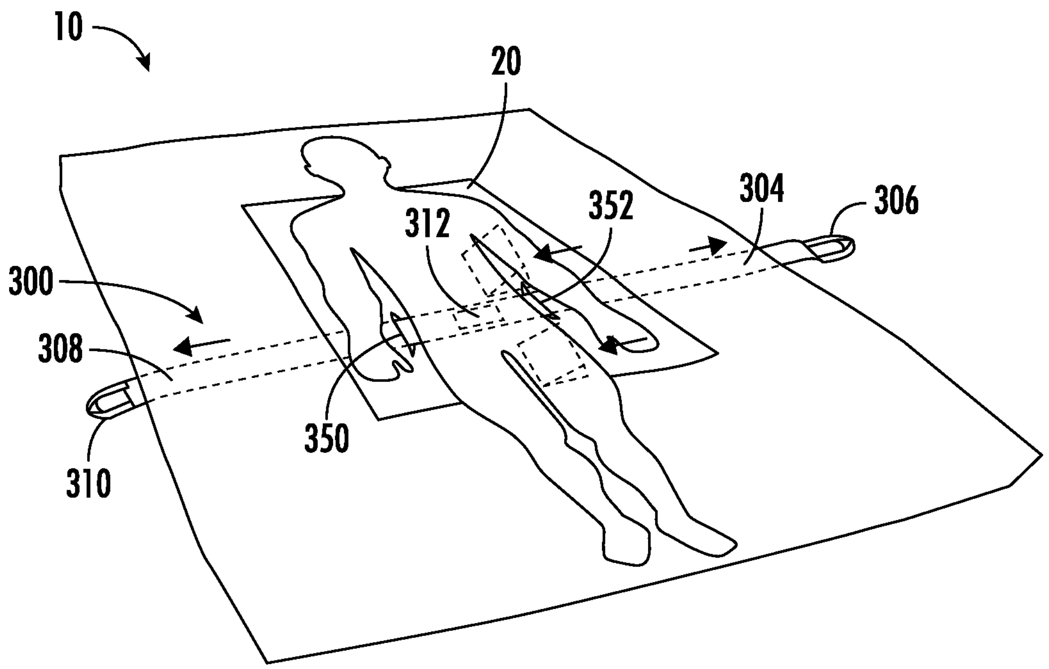
FIG. 18 is another top view of a sensor belt with a patient positioning system of the system of FIG. 1, according to an exemplary embodiment.

Referring now to FIGS. 17-18, a belt of the PPS system 200 is shown in a patient positioning system, according to an exemplary embodiment. In an exemplary embodiment, the belt is the sensor belt 300 of FIG. 16, and the patient positioning system is the system 10 of FIGS. 1-11. As shown in FIGS. 17-18, the system 10 includes the sheet 20 having a first slit 350 and a second slit 352. According to an exemplary embodiment, the first slit 350 and the second slit 352 are vertical slits (e.g., voids, openings, spaces, etc.), and are configured to selectively receive the sensor belt 300. In an exemplary embodiment, the first slit 350 and the second slit 352 are laterally spaced equidistant from a centerline of the sheet 20. In other embodiments, the first slit 350 and the second slit 352 comprise other configurations (e.g., four slits, six slits, holes, openings, etc.) and/or are positioned at other positions in the system 10 (e.g., at the top edge of the sheet 20, at the bottom edge the sheet 20, at the top and bottom edges of the sheet 20, etc.).

In an illustrative example, the belt (e.g., the sensor belt 300) is selectively received in the patient positioning system (e.g., the system 10). According to an exemplary embodiment, the first handle 306 (and the first end 304) of the sensor belt 300 is manipulated to move along the bottom surface of the sheet 20, and through the first slit 350 (e.g., from the bottom surface of the sheet 20 toward a top surface of the sheet 20). The first handle 306 may then be manipulated to move laterally across the top surface of the sheet 20 toward the second slit 352. In an exemplary embodiment, the first handle 306 (and the first end 304) is further manipulated to move through the second slit 352 (e.g., from the top surface of the sheet 20 to the bottom surface of the sheet 20). The first handle 306 may be manipulated (e.g., pulled, etc.) in order to pull the sensor belt 300 (e.g., the base 302), the central pocket 312, and/or the belt sensor system 320 through the first slit 350 toward a centerline of the sheet 20. According to an exemplary embodiment, once the central pocket 312 (and the belt sensor system 320) is positioned on the top surface of the sheet 20 (and the base 302 is woven through the first slit 350 and the second slit 352), the first handle 306 and/or the second handle 310 may be manipulated (e.g., pulled, etc.) to center the central pocket 312 between the first slit 350 and the second slit 352. In some embodiments, and as shown in FIG. 18, the sensor belt 300 (e.g., the base 302) may further be positioned relative to (a) wedge(s) (e.g., above a wedge, below a wedge, between two wedges, etc.). In this regard, the central pocket 312 and/or the belt sensor system 320 (i.e., the belt sensor 322 and the belt pad 324) may be positioned on the top surface of the sheet 20 and/or at an adequate position beneath a patient (e.g., at the patient's centerline, the patient's sacrum, etc.).

In another illustrative example, the belt (e.g., the sensor belt 300) is selectively received in the patient positioning system (e.g., the system 10). According to an exemplary embodiment, the central pocket 312 of the belt is positioned on a top surface of the sheet 20 in an adequate position between the first slit 350 and the second slit 352. The first handle 306 may then be manipulated to move laterally across the top surface of the sheet 20 and through the second slit 352 (e.g., from the top surface of the sheet 20 to the bottom surface of the sheet 20). The second handle 310 may then (or simultaneously) be manipulated to move laterally across the top surface of the sheet 20 and through the first slit 350 (e.g., from the top surface of the sheet 20 to the bottom surface of the sheet 20). According to an exemplary embodiment, once the base 302 is woven through the first slit 350 and the second slit 352, the first handle 306 and/or the second handle 310 may be manipulated (e.g., pulled, etc.) to center the central pocket 312 between the first slit 350 and the second slit 352. In some embodiments, and as shown in FIG. 18, the sensor belt 300 (e.g., the base 302) may further be positioned relative to (a) wedge(s) (e.g., above a wedge, below a wedge, between two wedges, etc.). In this regard, the central pocket 312 and/or the belt sensor system 320 (having the belt sensor 322 and the belt pad 324) may be positioned on the top surface of the sheet 20 and/or at an adequate position beneath a patient (e.g., at the patient's centerline, the patient's sacrum, etc.). It should be noted that while FIG. 18 depicts a representation of a patient's body, this depiction is for illustrative purposes only. The depiction of said patient, device, and support surface is not to scale and does not represent the only possible positioning of a patient disposed on the sheet 20.

Figure 19:
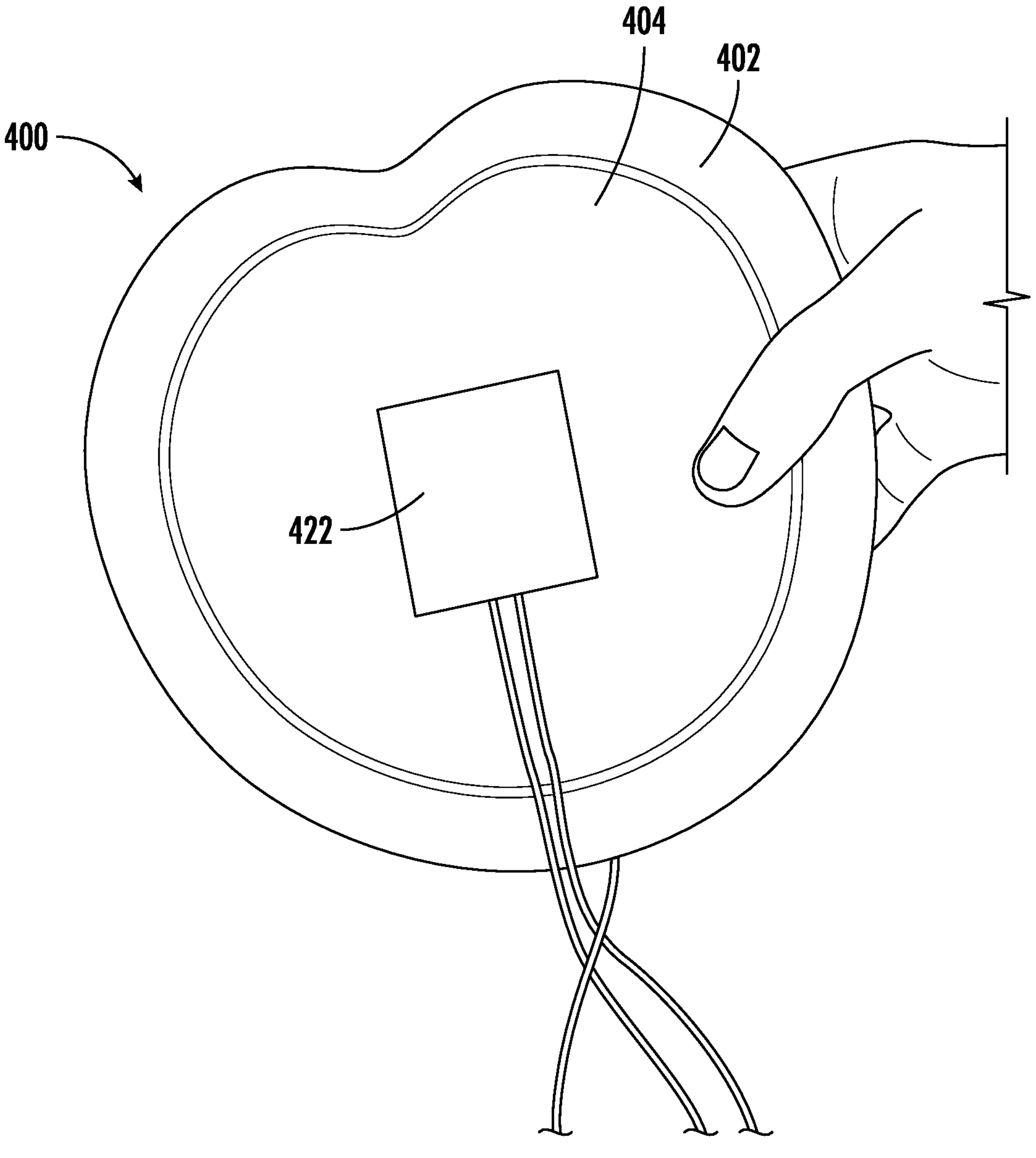
FIG. 19 is a rear view of a sacral pad, according to an exemplary embodiment.
Figure 20:
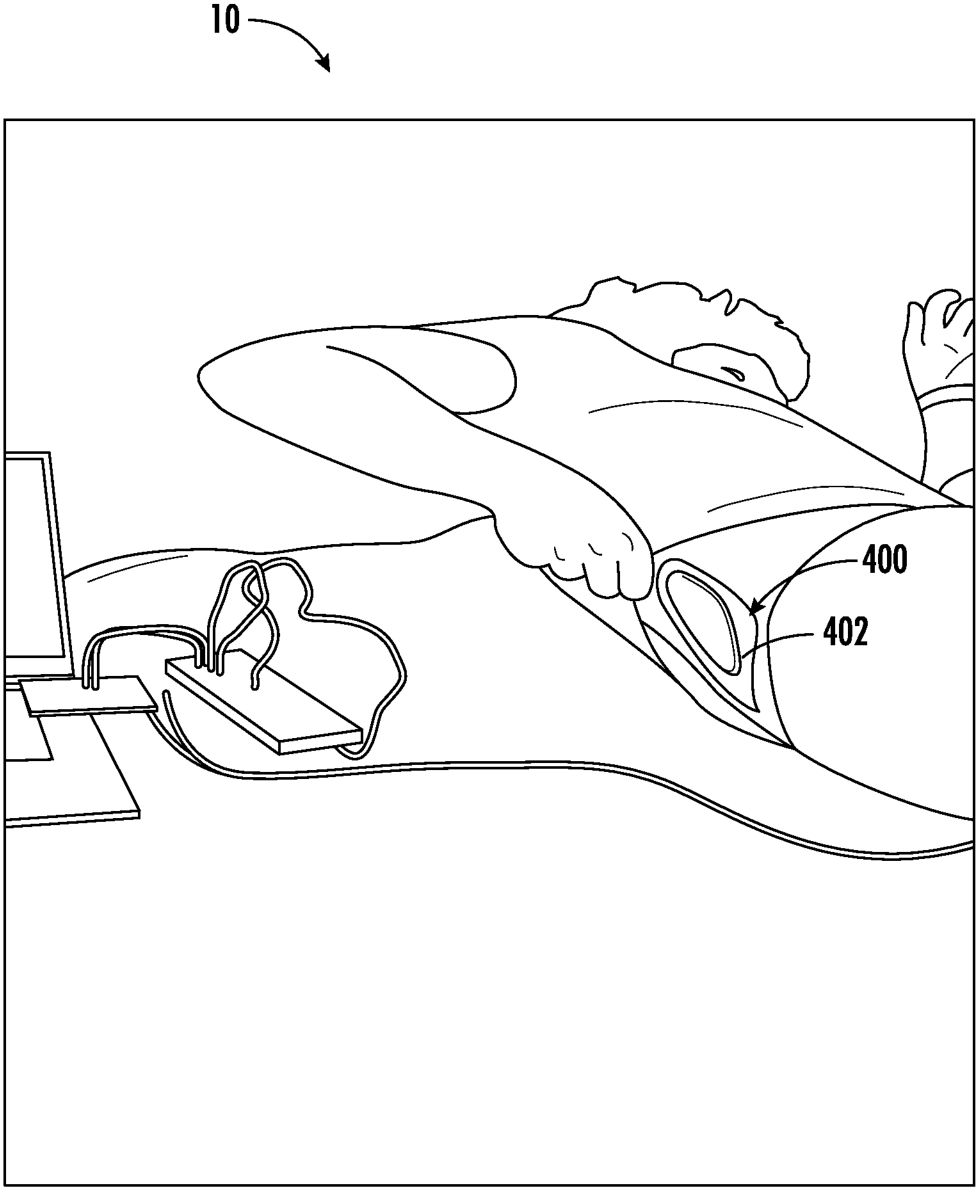
FIG. 20 is a side view of a sacral pad with a patient positioning system of the system of FIG. 1, according to an exemplary embodiment.

Referring now to FIGS. 19-20, a sacral pad of the PPS system 200 is shown, according to an exemplary embodiment. In an exemplary embodiment, the sacral pad (shown as sacral pad 400) includes a body 402 (having a first surface 404 and a second surface 406), a pad 408, and a sacral sensor system 420. The body 402 may be formed of any suitable insulating and/or sanitary material (e.g., silicone, polyurethane, etc.), and may be configured to house the pad 408 and/or the sacral sensor system 420. In an exemplary embodiment, the body 402 is substantially round; however, in other embodiments the body 402 is another suitable shape and/or configuration (e.g., heart shaped, square, oval, rectangular, etc.). The pad 408 may be formed of a suitable compressible and/or deformable material (e.g., plush, polymer foam, etc.), and may be configured to support and/or provide comfort to a patient. According to an exemplary embodiment, the first surface 404 includes a high-friction material (e.g., adhesive silicone, etc.), and is configured to adhere (e.g., stick, etc.) to an adequate position of a patient (e.g., at the patient's centerline, the patient's sacrum, etc.). The high-friction material (e.g., adhesive silicone, etc.) may be removable, for example to be replaced, sanitized, etc. In some embodiments, the second surface 406 includes a low-friction material (e.g., non-stick coating, etc.), and is configured to reduce frictional forces on the body 402 and/or other components of a patient positioning system (e.g., the system 10).

According to an exemplary embodiment, the sacral sensor system 420 includes a plurality of sacral sensors 422. In an exemplary embodiment, the sacral sensors 422 are a force sensitive resistor and a gyroscope, and are configured to detect the amount of pressure applied (e.g., the weight of a patient) to the sacral pad 400. In some embodiments, the sacral sensors 422 are also configured to detect the amount of rotation (e.g., as a result of patient repositioning, etc.) of the body 402 and/or the sacral sensor system 420. Like the other sensors discussed above, the sacral sensors 422 may be coupled to other electronic components (e.g., wires, resisters, circuits, etc.), and may be configured to communicate sensor output data to other components of the PPS system 200 (e.g., a processor, a patient management system, a user application, etc.). In other embodiments, the sacral sensors 422 comprise any number of sensors (e.g., one, three, four, etc.), or are other suitable sensors (e.g., pressure sensors, temperature sensor, etc.).

In an illustrative example, the sacral pad (e.g., the sacral pad 400) is provide with the patient positioning system (e.g., the system 10). According to an exemplary embodiment, the first surface 404 is adhered to a patient (e.g., the sacrum of the patient, the lower back of the patient, etc.). The sacral pad 400 may be configured to adhere to the patient throughout a predetermined period of time (e.g., one hour, two hours, one day, two days, one week, etc.), and may provide sensor output data (e.g., to other components of the PPS system 200) in response to/changes in pressure applied to the sacral pad 400 (e.g., a patient applying static pressure, changes in pressure based on patient movement, etc.).

Figure 21:
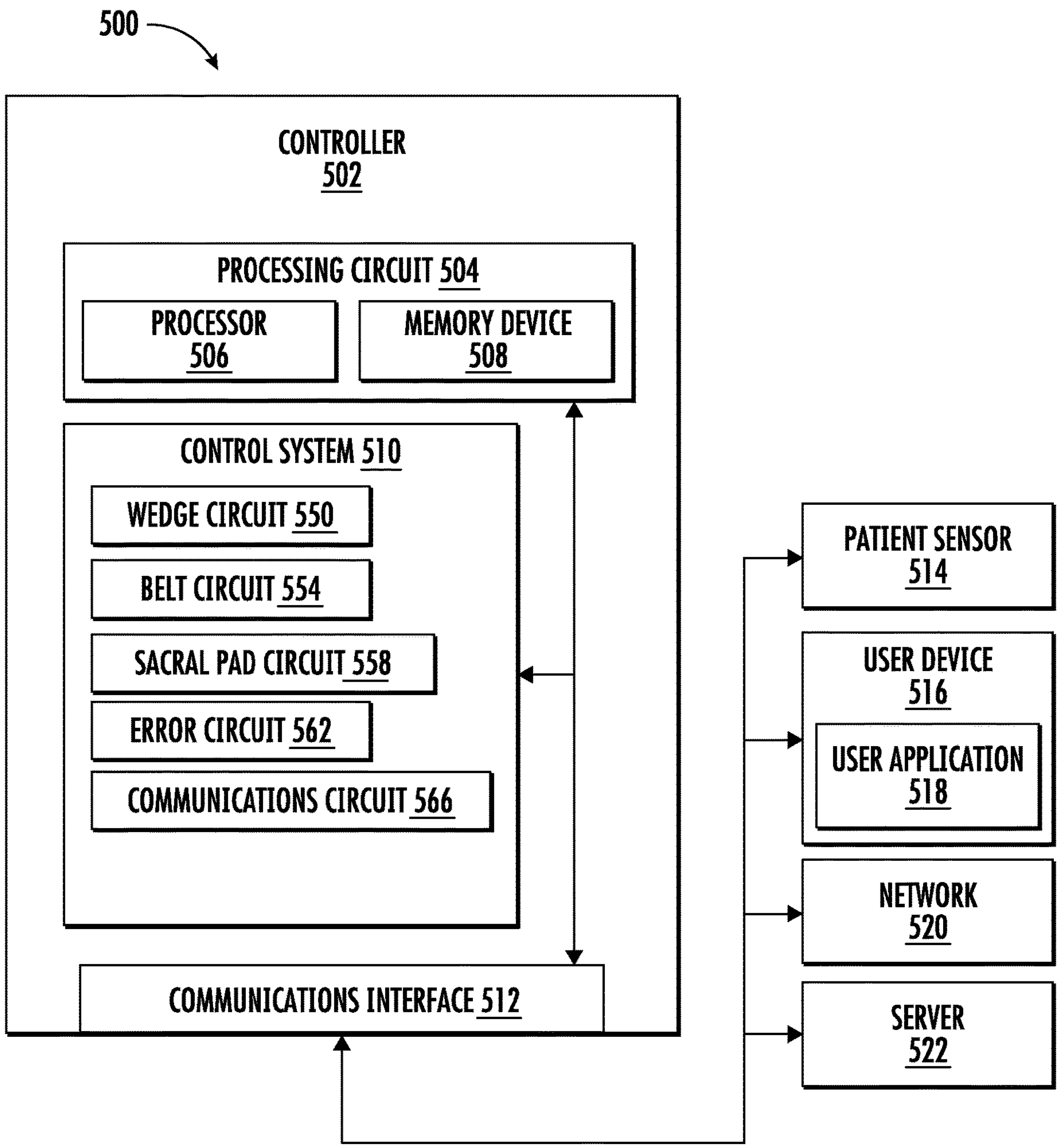
FIG. 21 is a block diagram of a patient positioning system of the system of FIG. 1, according to an exemplary embodiment.
Figure 22A:
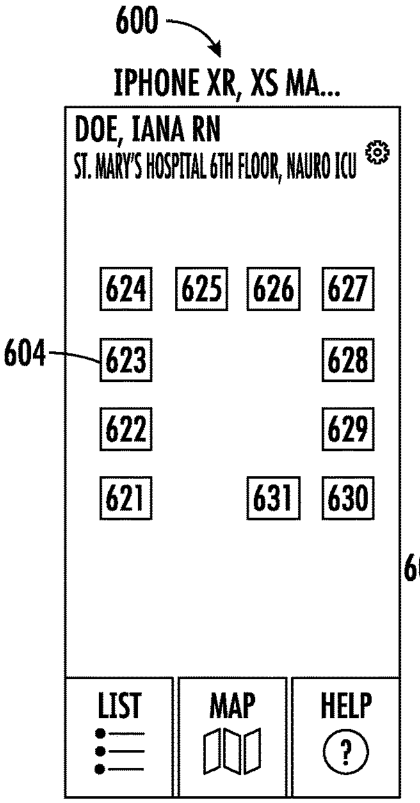
FIGS. 22A-L are diagrams of a plurality of graphical user interfaces (GUIs) of a patient positioning system of FIG. 1 and FIG. 21, according to an exemplary embodiment.
Figure 22B:
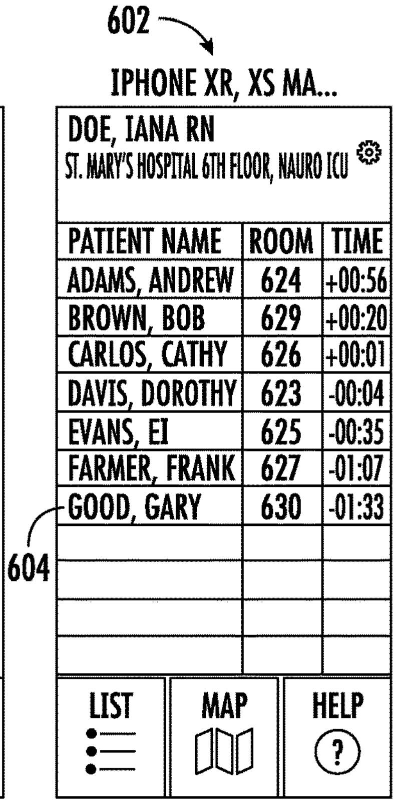
Figure 22C:
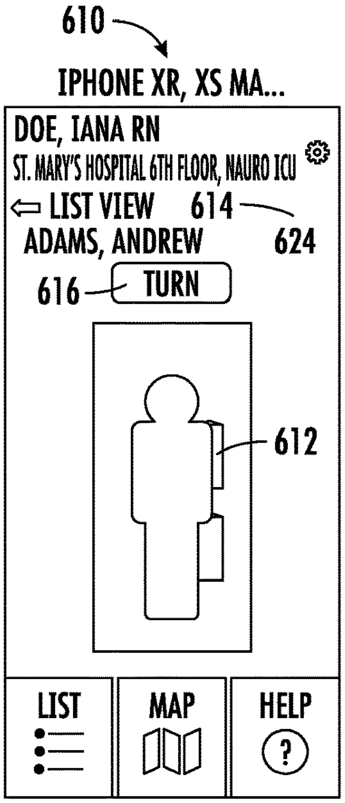
Figure 22D:
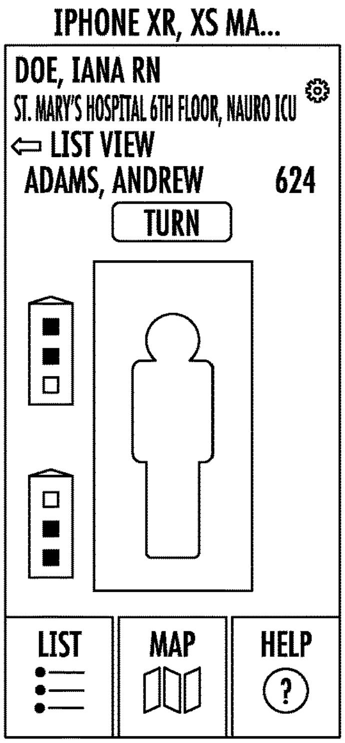
Figure 22E:
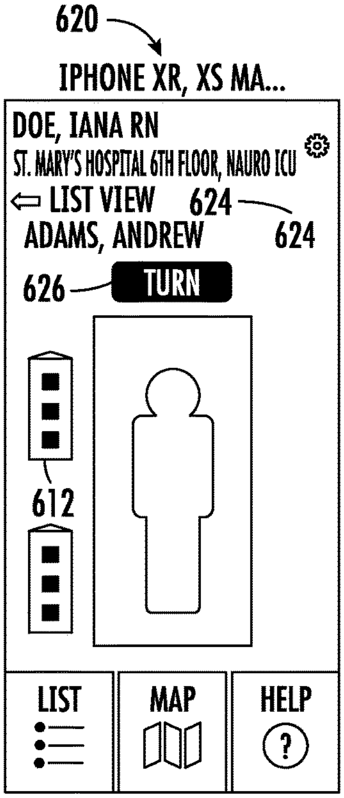
Figure 22F:
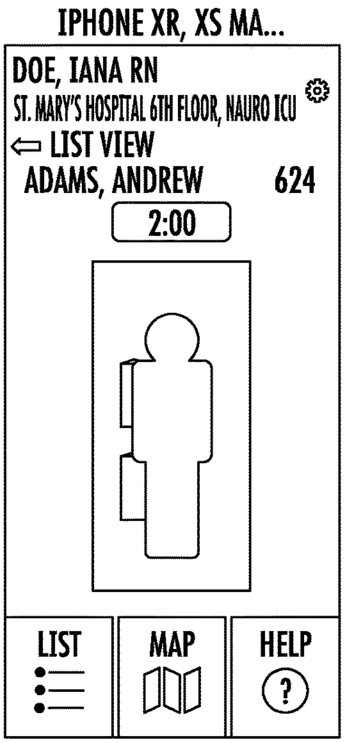
Figure 22G:
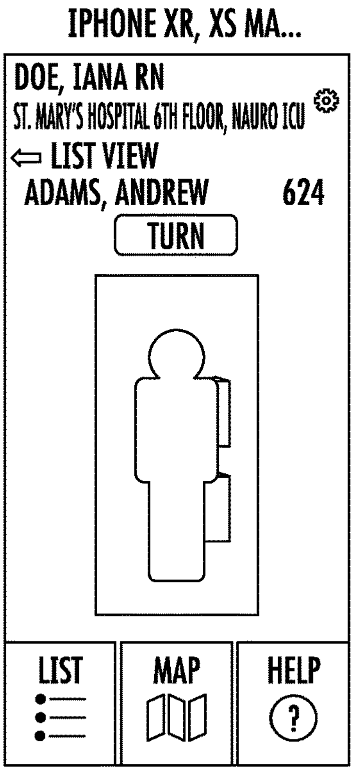
Figure 22H:
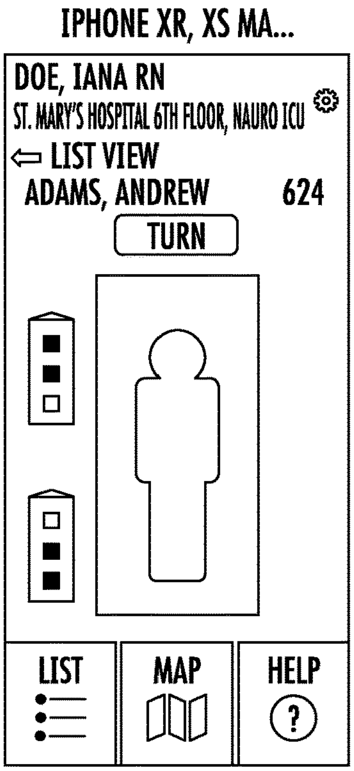
Figure 22I:
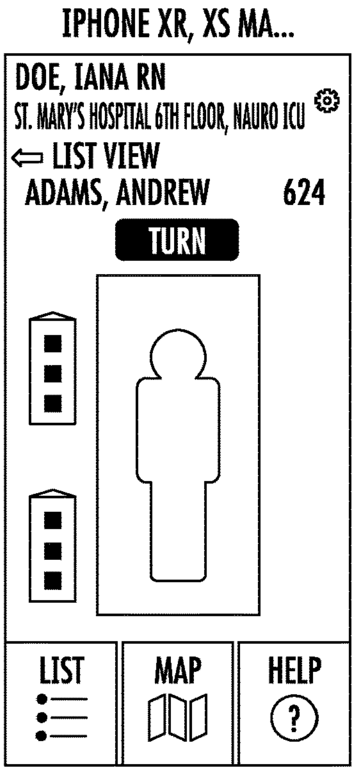
Figure 22J:
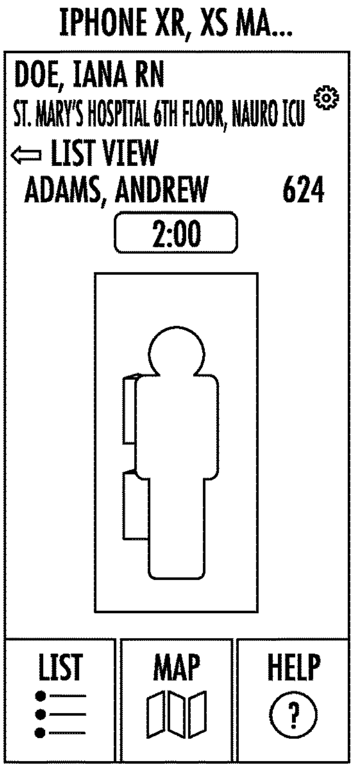
Figure 22K:
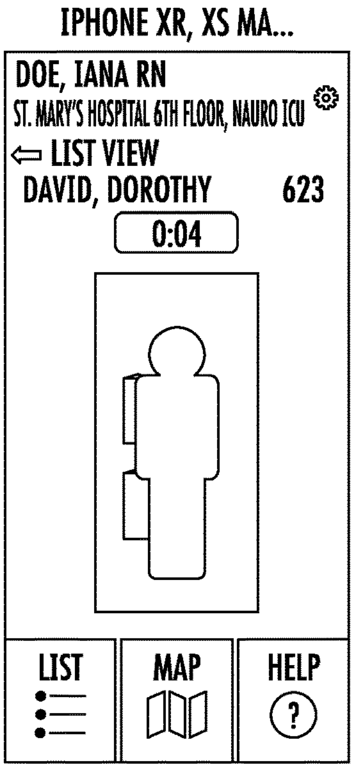
Figure 22L:
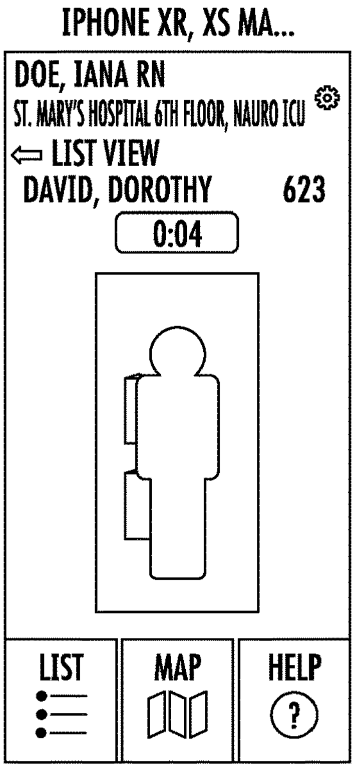
Figure 23A:
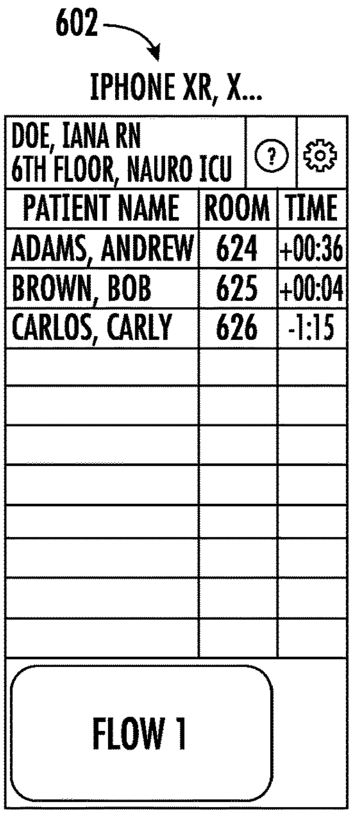
FIGS. 23A-J are diagrams of a plurality of graphical user interfaces (GUIs) of a patient positioning system of FIG. 1 and FIG. 21, according to an exemplary embodiment.
Figure 23B:
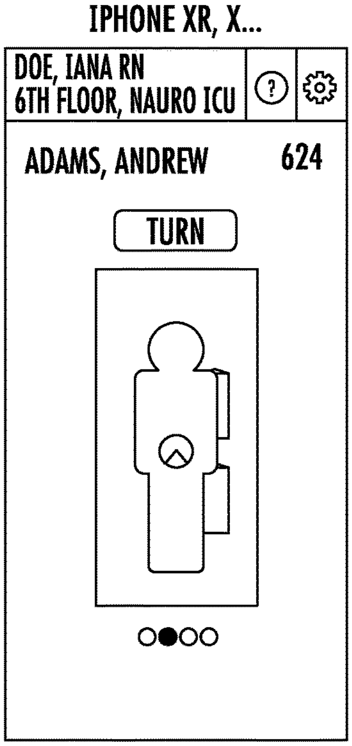
Figure 23C:
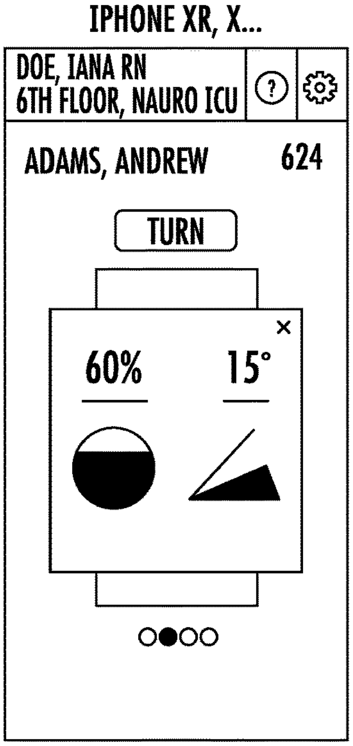
Figure 23D:
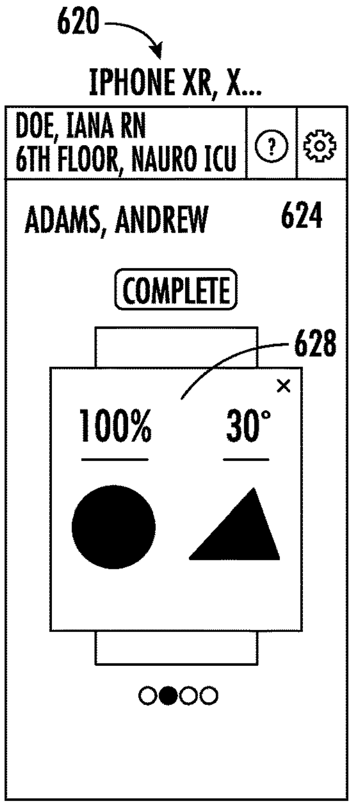
Figure 23E:
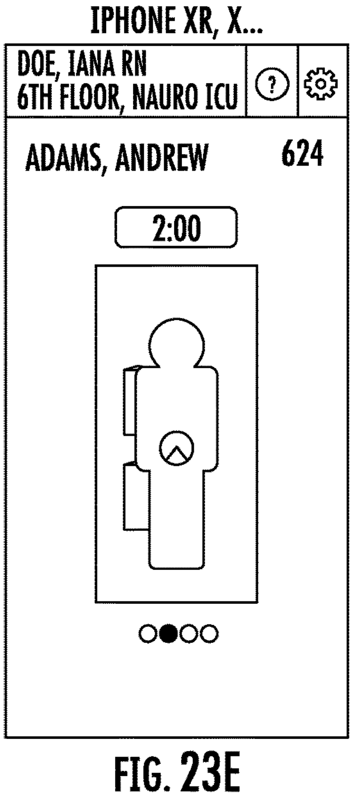
Figure 23F:
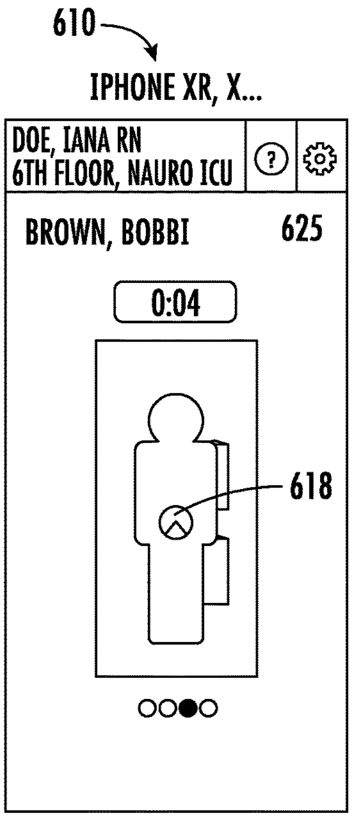
Figure 23G:
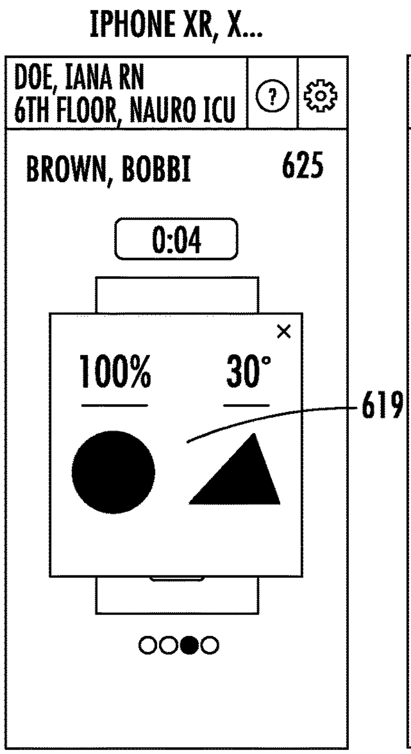
Figure 23H:
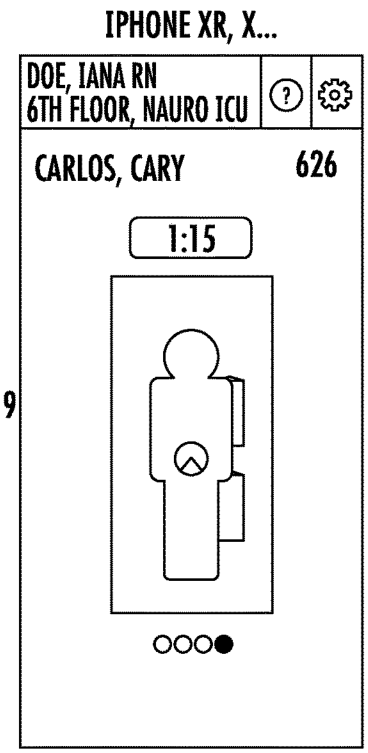
Figure 23I:
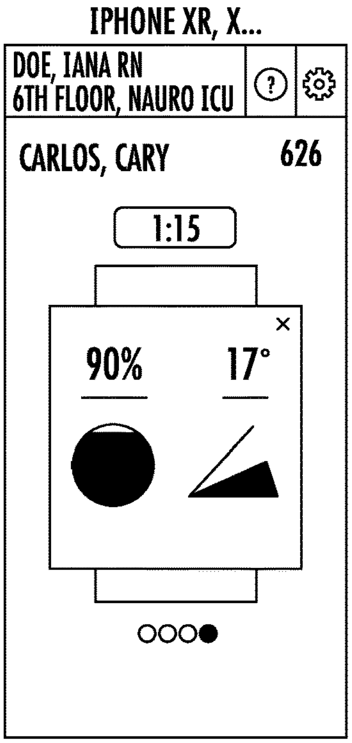
Figure 23J:
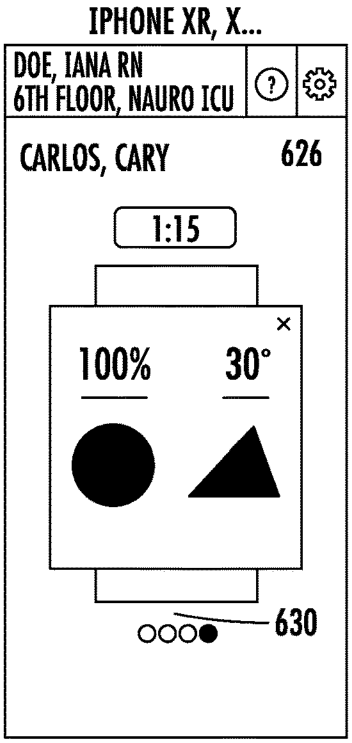

Referring to FIG. 21 generally, a patient management system (PMS) 500 is shown, according to an exemplary embodiment. In an exemplary embodiment, the PMS 500 is included in/with the components and/or systems of FIGS. 1-20 (e.g., the system 10, PPS system 200, etc.), and is configured to monitor the position of a patient. The PMS 500 may be configured to monitor, analyze, and/or process inputs (or outputs) from various components and/or systems of FIGS. 1-20. In some embodiments, the PMS is configured to analyze, process, and/or send outputs to various components and/or systems of FIGS. 1-20.

As shown in FIG. 21, the PMS 500 includes a controller 502 that is communicably coupled with one or more external sources. In an exemplary embodiment, the controller 502 includes a processing circuit 504, having a processor 506 and a memory device 508, a control system 510 (having a plurality of circuits), and a communications interface 512. In an exemplary embodiment, the communications interface 512 may be communicably coupled to one or more external sources, for example a patient sensor 514, a user device 516 (including a user application 518), a network 520, and/or a server 522, such that the controller 502 and various components thereof can send and receive data via the communications interface 512, as discussed below. Generally, the controller 502 is structure to receive, process, analyze, determine and/or send data relating to various components of a patient positioning system (e.g., the system 10, the PPS system 200, etc.).

Referring first to the controller 502, as shown in FIG. 21, the controller 502 includes the processing circuit 504, having the processor 506 and the memory device 508. In an exemplary embodiment, the processing circuit 504 may be structured or configured to execute or implement the instructions, commands, and/or control processes described herein with respect to the circuits (e.g., circuits 550-566) of the control system 510. The depicted configuration represents the circuits (e.g., circuits 550-566) of the control system 510 as machine or computer-readable media. However, this illustration is not meant to be limiting as the present disclosure contemplates other embodiments where the circuits (e.g., circuits 550-566) of the control system 510, or at least one circuit, is configured as a hardware unit. All such combinations and variations are intended to fall within the scope of the present disclosure.

As shown in FIG. 21, in an exemplary embodiment the processing circuit 504 includes the processor 506. According to an exemplary embodiment, the hardware and data processing components used to implement the various processes, operations, illustrative logics, logical blocks, modules and circuits described in connection with the embodiments disclosed herein (e.g., the processor 506) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. In some embodiments, a general purpose processor may be a microprocessor, or, any conventional processor, or state machine. In an exemplary embodiment, the processor 506 may also be implemented as a combination of computing devices, such as a combination of a DSP and a microprocessor, a plurality of microprocessors, one or more microprocessors in conjunction with a DSP core, or any other such configuration. The one or more processors may be shared by multiple circuits (e.g., circuits 550-566 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In an exemplary embodiment, two or more processors may be coupled via a bus to enable independent, parallel, pipelined, or multi-threaded instruction execution. All such variations are intended to fall within the scope of the present disclosure.

Also shown in FIG. 21, in an exemplary embodiment the processing circuit 504 also includes the memory device 508. According to an exemplary embodiment, the memory device 508 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 508 may be communicably connected to the processor 506 to provide computer code or instructions to the processor 506 (and/or the processing circuit 504) for executing at least some of the processes described herein. Moreover, in an exemplary embodiment the memory device 508 may be or include tangible, non-transient volatile memory or non-volatile memory. Accordingly, the memory device 508 may include database components, object code components, script components, or any other type of information structure for supporting the various activities and information structures described herein.

As shown in FIG. 21, in an exemplary embodiment the control system 510 includes a plurality of circuits (e.g., circuits 550-566). In one configuration, the circuits 550-566 of the control system 510 are embodied as machine or computer-readable media that is executable by a processor, such as the processor 506. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the circuits (e.g., circuits 550-566) of the control system 510 may be embodied as hardware units, such as electronic control units. As such, the circuits (e.g., circuits 550-566) may be embodied as one or more circuitry components including, but not limited to, processing circuitry, network interfaces, peripheral devices, input devices, output devices, sensors, etc. In an exemplary embodiment, the circuits (circuits 550-566) may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the circuits (e.g., circuits 550-566) may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). In an exemplary embodiment, the circuits (e.g., circuits 550-566) may also include programmable hardware devices such as field programmable gate arrays, programmable array logic, programmable logic devices or the like. The circuits may include one or more memory devices for storing instructions that are executable by the processor(s) of the circuits (e.g., circuits 550-566). The one or more memory devices and processor(s) may have the same definition as provided below with respect to the memory device 508 and the processor 506. In some hardware unit configurations, the circuits (e.g., circuits 550-566) may be geographically dispersed throughout separate locations in a patient positioning system (e.g., the system 10, the PPS system 200, etc.). In an exemplary embodiment, and as shown in FIG. 21, the circuits (e.g., circuits 550-566) may be embodied in or within a single unit/housing, which is shown as the controller 502.

As discussed briefly above, in an exemplary embodiment the control system 510 may include a plurality of circuits. For example, the control system 510 may include any of a wedge circuit 550, a belt circuit 554, a sacral pad circuit 558, an error circuit 562, and a communications circuit 566. In an exemplary embodiment, the circuits of the control system 510 (e.g., circuits 550-566) are configured to receive data, and/or send data to, an external device (e.g., the patient sensor 514, user device 516, the network 520, the server 522 etc.) via the communications interface 512, the processing circuit 504 (e.g., the processor 506 and/or the memory device 508), and/or another circuit of the control system 510. Also in an exemplary embodiment, the circuits of the control system 510 (e.g., circuits 550-566) are further configured to receive, process, analyze, determine, communicate, send, etc. data relating to various components and/or systems of a patient positioning system (e.g., the system 10, the PPS system 200, etc.), as discussed below. The circuits of the control system (e.g., circuits 550-566) may be configured to send and/or receive data in real-time (e.g., to/from external devices, components of the controller 502, etc.).

In an exemplary embodiment, the wedge circuit 550 is configured to determine the properties and parameters of a wedge or a plurality of wedges (e.g., the wedge(s) 50A-B). According to an exemplary embodiment, the wedge circuit 550 is configured to receive wedge sensor input data (e.g., from the patient sensor 514, the wedge sensor system 202, the wedge sensor system 203, the wedge sensor(s) 204, etc.). Based on the wedge sensor input data, the wedge circuit 550 may be configured to determine the properties and/or parameters of the wedge(s) 50A-B. For example, the wedge circuit 550 may determine the amount of pressure applied at a wedge (e.g., static pressure, etc.), the change in pressure applied at a wedge (e.g., as a result of patient repositioning), the amount of time a pressure has been applied at a wedge (e.g., one hour, two hours, etc.), the amount of rotation at a wedge (e.g., as a result of a patient repositioning, etc.), etc. In some embodiments, the wedge circuit 550 is configured to receive wedge input data from other sources (e.g., an external device, the user device 516, the network 520, the server 522, etc.), and determine properties and/or parameters of the wedge(s) 50A-B based on other characteristics (e.g., healthcare provider preferences, regulatory and/or statutory requirements, safety guidelines, etc.). In an exemplary embodiment, the wedge circuit 550 is further configured to communicate the properties and/or parameters of a wedge (or a plurality of wedges) to other components (e.g., the user device 516, the user application 518, other components of the controller 502, etc.) as wedge output data.

In an exemplary embodiment, the belt circuit 554 is configured to determine the properties and parameters of a belt (e.g., the sensor belt 300). According to an exemplary embodiment, the belt circuit 554 is configured to receive belt sensor input data (e.g., from the patient sensor 514, the belt sensor system 320, the belt sensors 322, etc.). Based on the belt sensor input data, the belt circuit 554 may be configured to determine the properties and/or parameters of the sensor belt 300. For example, the belt circuit 554 may determine the amount of pressure applied to the sensor belt 300 (e.g., static pressure, etc.), the change in pressure applied to the sensor belt 300 (e.g., as a result of patient repositioning, etc.), the amount of time a pressure has been applied to the sensor belt 300 (e.g., one hour, two hours, etc.), the amount of rotation of the sensor belt 300 (e.g., as a result of patient repositioning, etc.), etc. In some embodiments, the belt circuit 554 is configured to receive belt input data from other sources (e.g., an external device, the user device 516, the network 520, the server 522, etc.), and determine properties and/or parameters of the sensor belt 300 based on other characteristics (e.g., healthcare provider preferences, regulatory and/or statutory requirements, safety guidelines, etc.). In an exemplary embodiment, the belt circuit 554 is further configured to communicate the properties and/or parameters of the sensor belt 300 to other components (e.g., the user device 516, the user application 518, other components of the controller 502, etc.) as belt output data.

According to an exemplary embodiment, the sacral pad circuit 558 is configured to determine the properties and parameters of a sacral pad (e.g., the sacral pad 400). According to an exemplary embodiment, the sacral pad circuit 558 is configured to receive sacral pad sensor input data (e.g., from the patient sensor 514, the sacral sensor system 430, the sacral sensors 422, etc.). Based on the sacral pad sensor input data, the sacral pad circuit 558 may be configured to determine the properties and/or parameters of the sacral pad 400. For example, the sacral pad circuit 558 may determine the amount of pressure applied to the sacral pad 400 (e.g., static pressure, etc.), the change in pressure applied to the sacral pad 400 (e.g., as a result of patient repositioning, etc.), the amount of time a pressure has been applied to the sacral pad 400 (e.g., one hour, two hours, etc.), the amount of rotation of the sacral pad 400 (e.g., as a result of patient repositioning, etc.), etc. In some embodiments, the sacral pad circuit 558 is configured to receive sacral pad input data from other sources (e.g., an external device, the user device 516, the network 520, the server 522, etc.), and determine properties and/or parameters of the sacral pad 400 based on other characteristics (e.g., healthcare provider preferences, regulatory and/or statutory requirements, safety guidelines, etc.). In an exemplary embodiment, the sacral pad circuit 558 is further configured to communicate the properties and/or parameters of the sacral pad 400 to other components (e.g., the user device 516, the user application 518, other components of the controller 502, etc.) as sacral pad output data.

In an exemplary embodiment, the error circuit 562 is configured to process input data and determine whether an error message (and/or another message) should be communicated. In an exemplary embodiment, the error circuit 562 receives various forms of input data, for example wedge output data, belt output data, sacral pad output data, or any other type of input data from other suitable sources (e.g., input data from external devices, the network 520, the server 522, etc.). In some embodiments, the error circuit 562 is also configured to receive threshold data from other sources (e.g., an external device, the user device 516, the network 520, the server 522, the memory device 508, other components of the controller 502, etc.). Based on the input data (and/or the threshold data), the error circuit 562 is configured to process the input data, and determine whether an error message (and/or another message) should be communicated (e.g., in the form of error output data), as discussed below.

For example, in an exemplary embodiment the error circuit 562 receives wedge output data from the wedge circuit 550, indicating the amount of pressure(s) applied to wedge(s) 50A-B. The error circuit 562 may also receive wedge threshold input data (e.g., from the user device 516, the network 520, etc.), indicating a minimal threshold amount of pressure(s) to be applied to wedge(s) 50A-B. According to an exemplary embodiment, if the error circuit 562 determines that the amount of pressure(s) applied to wedge(s) 50A-B is less than the minimum threshold amount of pressure(s) to be applied to wedge(s) 50A-B, the error circuit 562 communicates an error message (e.g., color, sound, message, etc.), in the form of error output data. In another example, the error circuit 562 may receive belt input data from the belt circuit 5554 and/or sacral pad input data from the sacral pad circuit 558, indicating the change in rotational geometry of a patient during repositioning. The error circuit 562 may also receive rotational change threshold input data (e.g., from the user device 516, the network 520, etc.), indicating a threshold amount of rotational change that can be applied to a patient during a repositioning. According to an exemplary embodiment, if the error circuit 562 determines that the change in rotational geometry is greater than the threshold amount of rotational change that can be applied to a patient during repositioning, the error circuit 562 communicates an error message (e.g., color, sound, message, etc.), in the form of error output data.

In yet another example, the error circuit 562 may receive wedge output data from the wedge circuit 550, belt output data from the belt circuit 554, and/or sacral pad output data from the sacral pad circuit 558, all indicating the amount of time pressure(s) have been applied to the wedge 50A-B, the sensor belt 300, and/or the sacral pad 400. The error circuit 562 may also receive threshold input data (e.g., from the user device 516, the network 520, etc.), indicating a threshold amount of time pressure(s) can be applied to a patient in a single position. According to an exemplary embodiment, if the error circuit 562 determines that the amount of time pressure(s) have been applied is greater than the threshold amount of time pressure(s) can be applied, the error circuit 562 communicates an error message in the form of error output data. It should be understood that while certain exemplary embodiments are disclosed, this is not intended to be limiting and other exemplary embodiments (e.g., involving the error circuit 562) are contemplated.

In an exemplary embodiment, the communications circuit 566 is configured to receive input data (e.g., from the circuits 550-562 of the control system 510, the processor 506 and/or the memory device 508 of the processing circuit 504, etc.), and communicate output data to the external devices (e.g., the patient sensor 514, the user device 516, the user application 518, the network 520, the server 522, etc.). In an exemplary embodiment, the communications circuit 566 may be configured to provide any of the data that is collected, calculated, processed, analyzed, etc., as described above, to any external devices or other suitable devices.

Referring still to FIG. 21, and as discussed briefly above, in an exemplary embodiment the controller 502 also includes the communications interface 512. According to an exemplary embodiment, the communications interface 512 is structured to provide and enable communications between and among the processing circuit 504, the control system 510, and external devices (e.g., the patient sensor 514, the user device 516, the network 520, the server 522, etc.).

As shown in FIG. 21, in an exemplary embodiment the PMS 500 also includes a user device 516 (having a user application 518). The user device 516 may be a computing device including a memory (e.g., RAM, ROM, Flash memory, hard disk storage, etc.), a processor (e.g., a general purpose processor, an application specific integrated circuit (ASIC), one or more field programmable gate arrays (FPGAs), a group of processing components, or other suitable electronic processing components), and a user interface (e.g., a touch screen). The user device 516 may include, for example mobile phones, electronic tablets, laptops, desktop computers, workstations, and other types of electronic devices, which allow a user to interact with the components of the PMS 500 (e.g., through a user interface). In an exemplary embodiment, the user device 516 communicates (e.g., send, receive, transmit, etc. data) with the controller 502 via the communications interface 512. In some embodiments, the user device is also connected to the network 520 and/or the server 522 via an intranet or via the Internet, either via a wired connection or a wireless connection. According to an exemplary embodiment, the user device 516 is also configured to receive data (e.g., input data from a user via the touchscreen, from the user application 518, from the network 520, the server 522, etc.), and performs the functions of the controller 502 (e.g., the circuits 550-566 of the control system 510, the processing circuit 504, etc.), discussed above, via the components of the user device 516. In this regard, the user device 516 may be configured to receive, process, analyze, and send data relating to patient positioning characteristics and/or parameters.

Also shown in FIG. 21, in an exemplary embodiment the user device 516 also includes the user application 518. According to an exemplary embodiment, the user application 518 is configured to communicate (e.g., receive, transmit, send, etc. data) with the user device 516, and other components of the PMS 500. For example, the user application 518 may be configured to receive input data (e.g., patient positioning information from a user via the user interface, a touch screen, sensor output data from the patient sensor 514, etc.), communicate the input data with the user device 516 (which may process the input data), receive output data, and display the input/output data via a user interface, as discussed below. Also in an exemplary embodiment, the user application 518 is further configured to communicate the input data (e.g., in the form of user application output data) to the controller 502 via the communications interface 512. As discussed above, the circuits (e.g., circuits 550-566) may receive and process the user application output data, and provide additional output data (e.g., error output data from the error circuit 562, output data from the communications circuit 566, etc.). In an exemplary embodiment, the user application 518 displays the input/output data via a user interface, which may be manipulated by a user, as discussed below.

Referring still to FIG. 21, in an exemplary embodiment the PMS 500 also includes the patient sensor 514. The patient sensor 514 may be any type of sensor that is configured to determine and/or measure one or more properties and/or parameters of various components of a patient monitoring system (e.g., the system 10, the PPS system 200, etc.). For example, the patient sensor 514 may determine the pressure (e.g., weight) properties of a patient relative to a first side (e.g., via the wedge sensor system 202, the wedge sensor system 203, the wedge sensor(s) 204, etc.), the rotational geometry properties of a patient as a patient is repositioned (e.g., via the belt sensor system 320, the belt sensors 322, the sacral sensor system 430, the sacral sensors 422, etc.), and/or the pressure properties of a patient over a period of time (e.g., via the wedge sensor system 202, the wedge sensor system 203, belt sensor system 320, the sacral sensor system 430, etc.). As shown in FIG. 21, the patient sensor 514 is communicably coupled with the controller 502, such that the patient sensor 514 and the controller 502 may send/receive data (as discussed above) via the communications interface 512. It should be understood that while only one patient sensor 514 is shown in FIG. 21, any number of patient sensors 514 may be used to determine and/or measure the properties and/or parameters of a patient positioning system. For example, the PMS 500 may include a plurality of patient sensors 514, including patient sensors 514 for the wedge sensor system 202, the wedge sensor system 203, the wedge sensor(s) 204, the belt sensor system 320, the belt sensors 322, the sacral sensor system 430, and/or the sacral sensors 422, or any combination thereof. It should also be understood that while the patient sensor 514 is shown, the controller 502 may be configured to determine and/or measure the properties and/or parameters of a patient positioning system.

As shown in FIG. 21, in an exemplary embodiment the PMS 500 also includes the network 520. The network 520 may be a communications network (e.g., a WAN, the Internet, a cellular network, etc.) and/or any suitable wired or wireless network. In an exemplary embodiment, the controller 502, the user device 516 (the user application 518), the patient sensor 514, and/or the server 522 are configured to receive and transmit data via the network 520.

Also shown in FIG. 21, in an exemplary embodiment the PMS 500 also includes the server 522. The server 522 may be any suitable computing device or system, for example, a desktop or laptop computer, a remote system (e.g., a cloud server), central computing system, etc. In an exemplary embodiment, the server 522 is configured to receive, process, store, and/or transmit data (e.g., data from any of the circuits 550-566 of control system 510, data from the components of the controller 502, etc.) to/from various other components of the PMS 500. For example, the server 522 may be configured to receive and transmit patient positioning data via the network 520. In some embodiments, the server 522 is also configured to perform any of the functions of the controller 502 to provide data to the user device 516 (and the user application 518).

Referring now generally to FIGS. 22-23, according to an exemplary embodiment a patient positioning interface is provided, which may present a variety of graphical user interfaces (GUIs). The patient positioning interface (e.g., the GUIs) may be presented via a user interface of the user device 516 and/or via the user application 518, and may be part of the PMS 500 of FIG. 21. For exemplary purposes only, FIGS. 22-23 describe various GUIs as being presented via the user application 518 (e.g., on a mobile device); however, this is not intended to be limiting, and the GUIs may be presented via any other suitable applications and/or devices. As discussed in further detail below, in an exemplary embodiment the user application 518 (via the user device 516) provides a patient map GUI, a patient list GUI, a patient positioning GUI, etc.

Referring now to FIGS. 22A-L, a patient map interface 600 and a patient list interface 602 are shown, according to an exemplary embodiment. In an exemplary embodiment, the patient map interface 600 and/or the patient list interface 602 include a plurality of status indicators 604 (see, e.g., FIGS. 22A-B). For example, the patient map interface 600 and/or the patient list interface 602 may provide a positioning status indicator associated with a patient (e.g., a color, a message, a sound, etc.), and/or a room status indicator associated with a room (e.g., a color, a message, a sound, etc.). According to an exemplary embodiment, the positioning status indicator indicates the status of a particular patient (e.g., overdue for repositioning, not overdue, positioned correctly, positioned incorrectly, etc.), and the room status indicator indicates the status of a particular room (e.g., occupied, empty, etc.). In this regard, a healthcare provider may be informed (e.g., based on a first positioning status indicator of a first patient) if a certain action (e.g., repositioning, etc.) is or is not needed.

Referring still to FIGS. 22A-L, an overdue patient positioning interface 610 is shown, according to an exemplary embodiment. In an exemplary embodiment, the overdue patient positioning interface 610 includes a patient diagram, a wedge positioning indicator 612, an overdue time indicator 614, and a turn button 616 (see, e.g., FIG. 22C). According to an exemplary embodiment, the patient diagram provides a visual representation of the patient's positioning, and includes additional positioning status indicators (e.g., a color, a message, a sound) that indicate the pressure at various positions on a patient's body. For example, the patient diagram may include a first positioning status indicator (e.g., a blue color, etc.) that indicates the status at a first position (e.g., not overdue on the patient's left side), and a second positioning status indicator (e.g., an orange color, etc.) that indicates the status at a second position (e.g., overdue on the patient's right side). According to an exemplary embodiment, the wedge positioning indicator 612 is shown on the patient diagram relative to the patient (e.g., on the left side of the patient, etc.), and indicates the position of a wedge relative to a patient. In an exemplary embodiment, the overdue time indicator 614 is shown on the overdue patient positioning interface 610, and indicates the time remaining before a patient should be repositioned (e.g., is overdue, etc.). According to an exemplary embodiment, the turn button 616 may be selected, and the user application 518 may display a secondary GUI that displays a proper patient positioning interface, as discussed below.

Referring still to FIGS. 22A-L, a proper patient positioning interface 620 is shown, according to an exemplary embodiment. In an exemplary embodiment, the proper patient positioning interface 620 includes a patient diagram, a wedge sensor indicator 622, a time indicator 624, and a complete indicator 626 (see, e.g., FIGS. 22E-L). As discussed above, the patient diagram may provide a visual representation of the patient's positioning, and indicates additional positioning status indicators that indicate the pressure at various positions on a patient's body. According to an exemplary embodiment, the wedge sensor indicator 622 is shown on the proper patient positioning interface 620, and indicates the live pressure (e.g., via colors, squares, sounds, etc.) applied by a patient at a particular location (e.g., a first wedge, a second wedge, etc.). For example, the wedge sensor indicator 622 may indicate sufficient pressure at a first wedge, insufficient pressure at a second wedge, etc. In an exemplary embodiment, when the turn button 616 is selected, and the patient is properly positioned (as discussed above), the time indicator 624 resets on the proper patient positioning interface 620 (e.g., to two hours, two and a half hours, etc.). Similarly, when the turn button 616 is selected (as discussed above), the complete indicator 626 is displayed on the proper patient positioning interface 620, indicating that a patient repositioning is complete.

Referring now to FIGS. 23A-J, the patient list interface 602 of FIGS. 22A-L is shown, according to an exemplary embodiment. In an exemplary embodiment, the patient list interface 602 displays a list view of a single healthcare provider's patients (see, e.g., FIG. 23A). In other embodiments, the patient list interface 602 displays a list view of a plurality of healthcare providers' patients, or all of the healthcare providers' patients. Also shown in FIGS. 23A-J, the overdue patient positioning interface 610 of FIGS. 22A-L is shown to also include a sacral pad icon 618 (see, e.g., FIG. 23F). The sacral pad icon 618 may be selected, and the overdue patient positioning interface 610 may display a secondary sacral pad popup 619 (see, e.g., FIGS. 23F-G). According to an exemplary embodiment, the sacral pad popup 619 indicates the status of the sacral pad of a patient (e.g., position, pressure, etc.). Also shown in FIGS. 23A-J, the proper patient positioning interface 620 of FIGS. 22A-L is shown to also include an offload popup 628 (see, e.g., FIG. 23D) . After the turn button 616 is selected and the patient is properly positioned (as discussed above), the proper patient positioning interface 620 may display the offload popup 628. In an exemplary embodiment, the offload popup 628 indicates the percentage of pressure offloaded by a patient (e.g., based on pressure applied to a pressure sensor, rotation sensed by a gyroscope, a combination, etc.). Also shown in FIG. 23, a toggle icon 630 may be displayed on the overdue patient positioning interface 610, the proper patient positioning interface 620, and/or any other suitable interface (see, e.g., FIG. 23J). In an exemplary embodiment, the toggle icon 630 allows a user to transition between patients (e.g., interfaces), and displays the overdue patient positioning interfaces 610 in the order of time left until repositioning is needed (e.g., until overdue).

As an illustrative example, a patient positioning system may be used to initially position a patient. In an exemplary embodiment, a patient is positioned on a patient positioning system (e.g., the system 10, the PPS system 200, etc.). The sensors of the patient positioning system (e.g., the wedge sensor system 202, the wedge sensor system 203, the belt sensor system 320, the sacral sensor system 430, etc.) may communicate sensor output data to the controller 502 via the communications interface 512. The circuits (e.g., the wedge circuit 550, the belt circuit 554, the sacral pad circuit 558, etc.) may receive and process the sensor output data. The circuits (e.g., the error circuit 562) may also receive threshold input data, representing threshold pressures associated with a proper initial position. In an exemplary embodiment, the circuits then process the sensor output data (and the threshold input data) to determine whether the patient is in a proper initial position. If the error circuit 562 determines that the sensor output data (e.g., the wedge pressure data, belt pressure data, sacral pad pressure data, etc.) is below/above a respective threshold, the error circuit 562 may communicate an error message (in the form of output data) to the user device 516 via the communications interface 512. The user device 516 may display the error message in an interface (e.g., a color, message, sound, etc.), indicating to a user that the patient should be repositioned.

As another illustrative example, a patient positioning system may be used to monitor the position of a patient. In an exemplary embodiment, once a patient is properly positioned on a patient positioning system (e.g., the system 10, the PPS system 200, etc.), the sensors of the patient positioning system (as discussed above) may communicate sensor output data in real-time to the controller 502 via the communications interface 512. The circuits (as discussed above) may receive and process the sensor output data, as well as, threshold input data representing the threshold pressures associated with static patient positioning. In an exemplary embodiment, the circuits then process the sensor output data (and the threshold input data) to determine whether the patient is a proper static position. If the error circuit 562 determines that the sensor output data (e.g., the wedge, belt, and/or sacral pad pressure data, etc.) is below/above a respective threshold (e.g., a patient is inadequately positioned, migrating, etc.), the error circuit may communicate an error message to the user device 516. The user device 516 may display the error message in an interface (e.g., a color, message, sound, etc.), indicating to a user that a patient is not adequately positioned. In this regard, the patient positioning system may be configured to constantly monitor a patient's position, and detect if a patient is prematurely migrating out of position.

In yet another illustrative example, a patient positioning system may be used to monitor the time a patient is in a single position. In an exemplary embodiment, once a patient is properly positioned on a patient positioning system (e.g., the system 10, the PPS system 200, etc.), the sensors of the patient positioning system (as discussed above) may communicate sensor output data in real-time to the controller 502 via the communications interface 512. The circuits (as discussed above) may receive and process the sensor output data, as well as, threshold input data representing the threshold amount of time pressure(s) can be applied to positions on the patient. If the error circuit 562 determines that the sensor output data (e.g., the wedge, belt, and/or sacral pad pressure data, etc.) is above a respective threshold (e.g., a patient is overdue for repositioning, etc.), the error circuit may communicate an error message to the user device 516. The user device 516 may display the error message in an interface (e.g., a color, message, etc.), indicating to a user that a patient should be repositioned. In this regard, the patient positioning system may be configured to monitor the amount of time a patient is in a single position, and indicate to a healthcare professional when a patient should be repositioned.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 21, it should be understood that the controller 502 may include any number of circuits for completing the functions described herein. For example, the activities and functionalities of the circuit 550-566 may be combined in multiple circuits or as a single circuit. Additional circuits with additional functionality may also be included. Further, the controller 502 may further control other activity beyond the scope of the present disclosure.

As mentioned above and in one configuration, the "circuits" may be implemented in machine-readable medium for execution by various types of processors, such as the processor 506 of FIG. 21. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the patient positioning system and/or patient positioning sensor system as shown in the various exemplary embodiments is illustrative only. Additionally, any element disclosed in one embodiment may be incorporated or utilized with any other embodiment disclosed herein. For example, the patient positioning sensor system of the exemplary embodiment described herein may be incorporated in the system of the exemplary embodiment described herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A patient positioning system comprising:

a wedge comprising a wedge body, the wedge body having a top wall and a bottom wall, the wedge body being configured to deform in response to a pressure applied to the wedge, the wedge body defining a cavity;

an applicator base having a first side and a second side;

a plurality of sensors, the sensors being configured to sense the pressure applied to the wedge, the sensors being coupled to the first side; and an applicator sleeve, the applicator base and the sensors being disposed inside of the applicator sleeve such that the applicator sleeve covers the first side of the applicator base, the sensors, and the second side of the applicator base, the applicator sleeve and the applicator base therein being disposed inside the cavity such that the first side of the applicator base faces the top wall and the second side of the applicator base faces the bottom wall.

2. The patient positioning system of claim 1, wherein the cavity extends from a back wall of the wedge body to an apex of the wedge body.

3. The patient positioning system of claim 1, wherein the sensors comprise four sensors.

4. The patient positioning system of claim 1, wherein at least a portion of the top wall has a portion formed of a high-friction or gripping material and at least a portion of the bottom wall has at least a portion formed of a directional stitching material.

5. The patient positioning system of claim 1, wherein the cavity extends vertically downward from the top wall toward the bottom wall.

6. The patient positioning system of claim 4, wherein the at least a portion of the top wall is formed by directional glide material.

7. The patient positioning system of claim 1, wherein:

the wedge body comprises:

a back wall that is contiguous with the top wall and the bottom wall, a first sidewall that is contiguous with the top wall, the bottom wall, and the back wall, and a second sidewall that is contiguous with the top wall, the bottom wall, and the back wall.

8. The patient positioning system of claim 7, further comprising a support coupled to the wedge body along an apex of the wedge body, the apex being a junction between the top wall and the bottom wall, the support extending away from the wedge body.

9. The patient positioning system of claim 8, wherein the support comprises a pad divided into a plurality of chambers.

10. The patient positioning system of claim 7, wherein the top wall is positioned at a 30° angle to the bottom wall.

11. The patient positioning system of claim 7, wherein each of the first sidewall and the second sidewall is triangular.

12. The patient positioning system of claim 1, wherein the wedge body is made of a foam that has a relatively uniform compressibility.

13. The patient positioning system of claim 1, wherein the sensors comprise at least one rotational sensor that is configured to facilitate detection of an amount of rotation of the wedge.

14. The patient positioning system of claim 1, further comprising a patient management system communicatively coupled to the sensors.

15. The patient positioning system of claim 1, wherein the sensors are removably coupled to the first side.

16. The patient positioning system of claim 1, wherein the sensors are arranged in a square pattern on the first side.

17. The patient positioning system of claim 1, wherein the top wall is parallel to the first side.

18. The patient positioning system of claim 17, wherein the bottom wall is parallel to the first side.

19. The patient positioning system of claim 1, wherein the first side is square or rectangular.

20. The patient positioning system of claim 1, wherein the applicator base is configured to be removed from the applicator sleeve without uncoupling the sensors from the first side.

* * * * *